(12) United States Patent
Vrba et al.

(10) Patent No.: US 7,994,919 B2
(45) Date of Patent: Aug. 9, 2011

(54) SYSTEMS AND METHODS THAT INTEGRATE RADIO FREQUENCY IDENTIFICATION (RFID) TECHNOLOGY WITH AGENT-BASED CONTROL SYSTEMS

(75) Inventors: Pavel Vrba, Plzen (CS); Filip Macurek, Prague 14-Hostavice (CS); Vladimir Marik, Prague 5 (CS); Kenwood H. Hall, Hudson, OH (US); Pavel Tichy, Nymburk (CS)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 234 days.

(21) Appl. No.: 12/481,965

(22) Filed: Jun. 10, 2009

(65) Prior Publication Data
US 2009/0243808 A1    Oct. 1, 2009

Related U.S. Application Data

(62) Division of application No. 10/985,173, filed on Nov. 10, 2004, now Pat. No. 7,551,081.

(51) Int. Cl.
*G08B 13/14* (2006.01)

(52) U.S. Cl. ............... 340/572.1; 340/572.4; 340/572.8; 340/572.9; 340/573.1; 340/573.4; 340/10.52; 235/382; 235/385; 235/492; 700/215; 700/217; 700/224

(58) Field of Classification Search ............... 340/572.1, 340/572.4, 572.8, 572.9, 573.1, 573.4, 10.52; 235/382, 385, 492; 700/215, 217, 224
See application file for complete search history.

(56) References Cited

U.S. PATENT DOCUMENTS

| | | | |
|---|---|---|---|
| 2,999,499 | A | 9/1961 | Willet |
| 3,858,212 | A | 12/1974 | Tompkins et al. |
| 4,381,903 | A | 5/1983 | Atkins |
| 4,722,372 | A | 2/1988 | Hoffman et al. |
| 4,949,299 | A | 8/1990 | Pickett et al. |

(Continued)

FOREIGN PATENT DOCUMENTS

CN    1426546 A    6/2003

(Continued)

OTHER PUBLICATIONS

OA Dated Aug. 8, 2008 for U.S. Appl. No. 11/241,421, 49 pages.

(Continued)

*Primary Examiner* — Tai T Nguyen
(74) *Attorney, Agent, or Firm* — Turocy & Watson LLP; William R. Walbrun; John M. Miller

(57) ABSTRACT

The subject invention relates to systems and methods that distribute electronic data, such as Electronic Product Code (EPC) data, obtained from RFID tags by Radio Frequency Identification (RFID) readers and/or servers to agents within an agent-based control system. The systems and methods employ a component that collects, filters, processes, and stores electronic product data. The component collects electronic product data through corresponding reader and/or server interfaces. This data can be filtered to accept particular electronic product data, processed to a format suitable to the agents, and stored. Such storage can include delineating the electronic product data across rows of a table by electronic product code and across columns of the table by various types of data. Upon receiving a subscription and/or request from an agent for electronic product data, the component can obtain and convey the information to the agent.

15 Claims, 13 Drawing Sheets

U.S. PATENT DOCUMENTS

| | | |
|---|---|---|
| 4,967,940 A | 11/1990 | Blette et al. |
| 5,300,875 A | 4/1994 | Tuttle |
| 5,461,666 A | 10/1995 | McMahan et al. |
| 5,494,193 A | 2/1996 | Kirschner et al. |
| 5,613,228 A | 3/1997 | Tuttle et al. |
| 5,621,199 A | 4/1997 | Calari et al. |
| 5,629,981 A | 5/1997 | Nerlikar |
| 5,689,415 A | 11/1997 | Calotychos et al. |
| 5,701,127 A | 12/1997 | Sharpe |
| 5,703,347 A | 12/1997 | Reddersen et al. |
| 5,785,181 A | 7/1998 | Quartararo, Jr. |
| 5,798,693 A | 8/1998 | Engellenner |
| 5,822,714 A | 10/1998 | Cato |
| 5,874,724 A | 2/1999 | Cato |
| 5,874,896 A | 2/1999 | Lowe et al. |
| 5,905,249 A | 5/1999 | Reddersen et al. |
| 5,910,776 A | 6/1999 | Black |
| 5,947,167 A | 9/1999 | Bogen et al. |
| 5,949,335 A | 9/1999 | Maynard |
| 5,952,935 A | 9/1999 | Mejia et al. |
| 5,963,134 A | 10/1999 | Bowers et al. |
| 5,964,656 A | 10/1999 | Lawler, Jr. et al. |
| 5,971,587 A | 10/1999 | Kato et al. |
| 5,973,600 A | 10/1999 | Mosher, Jr. |
| 5,983,200 A | 11/1999 | Slotznick |
| 5,992,096 A | 11/1999 | De La Cerda et al. |
| 6,049,745 A | 4/2000 | Douglas et al. |
| 6,091,998 A | 7/2000 | Vasko et al. |
| 6,115,616 A | 9/2000 | Halperin et al. |
| 6,116,505 A | 9/2000 | Withrow |
| 6,121,878 A | 9/2000 | Brady et al. |
| 6,144,301 A | 11/2000 | Frieden |
| 6,150,948 A | 11/2000 | Watkins |
| 6,154,790 A | 11/2000 | Pruett et al. |
| 6,169,483 B1 | 1/2001 | Ghaffari et al. |
| 6,170,059 B1 | 1/2001 | Pruett et al. |
| 6,172,609 B1 | 1/2001 | Lu et al. |
| 6,205,362 B1 | 3/2001 | Eidson |
| 6,211,789 B1 | 4/2001 | Oldham et al. |
| 6,263,440 B1 | 7/2001 | Pruett et al. |
| 6,264,106 B1 | 7/2001 | Bridgelall |
| 6,265,976 B1 | 7/2001 | Roesner et al. |
| 6,272,321 B1 | 8/2001 | Bruhnke et al. |
| 6,275,681 B1 | 8/2001 | Vega et al. |
| 6,282,407 B1 | 8/2001 | Vega et al. |
| 6,282,455 B1 | 8/2001 | Engdahl |
| 6,285,295 B1 | 9/2001 | Casden |
| 6,286,762 B1 | 9/2001 | Reynolds et al. |
| 6,286,763 B1 | 9/2001 | Reynolds et al. |
| 6,293,467 B1 | 9/2001 | Reddersen et al. |
| 6,297,734 B1 | 10/2001 | Richardson et al. |
| 6,305,548 B1 | 10/2001 | Sato et al. |
| 6,307,517 B1 | 10/2001 | Lee |
| 6,317,027 B1 | 11/2001 | Watkins |
| 6,318,636 B1 | 11/2001 | Reynolds et al. |
| 6,330,971 B1 | 12/2001 | Mabry et al. |
| 6,342,839 B1 | 1/2002 | Curkendall et al. |
| 6,353,406 B1 | 3/2002 | Lanzl et al. |
| 6,354,493 B1 | 3/2002 | Mon |
| 6,362,738 B1 | 3/2002 | Vega |
| 6,366,206 B1 | 4/2002 | Ishikawa et al. |
| 6,377,176 B1 | 4/2002 | Lee |
| 6,377,203 B1 | 4/2002 | Doany |
| 6,377,764 B1 | 4/2002 | Morris-Jones |
| 6,392,544 B1 | 5/2002 | Collins et al. |
| 6,400,272 B1 | 6/2002 | Holtzman |
| 6,400,372 B1 | 6/2002 | Gossweiler, III et al. |
| 6,401,936 B1 | 6/2002 | Isaacs |
| 6,409,401 B1 | 6/2002 | Petteruti et al. |
| 6,415,978 B1 | 7/2002 | McAllister |
| 6,429,776 B1 | 8/2002 | Alicot et al. |
| 6,445,297 B1 | 9/2002 | Nicholson |
| 6,445,969 B1 | 9/2002 | Kenney |
| 6,448,886 B2 | 9/2002 | Garber et al. |
| 6,451,154 B1 | 9/2002 | Grabau |
| 6,476,708 B1 | 11/2002 | Johnson |
| 6,480,100 B1 | 11/2002 | Frieden et al. |
| 6,484,886 B1 | 11/2002 | Isaacs |
| 6,486,780 B1 | 11/2002 | Garber |
| 6,501,382 B1 | 12/2002 | Rehfus |
| 6,505,780 B1 | 1/2003 | Yassin et al. |
| 6,517,000 B1 | 2/2003 | McAllister et al. |
| 6,523,752 B2 | 2/2003 | Nishitani et al. |
| 6,529,880 B1 | 3/2003 | McKeen et al. |
| 6,547,040 B2 | 4/2003 | Goodwin, III |
| 6,549,064 B2 | 4/2003 | Bandy et al. |
| 6,554,187 B2 | 4/2003 | Otto |
| 6,563,425 B2 | 5/2003 | Nicholson et al. |
| 6,566,997 B1 | 5/2003 | Bradin |
| 6,585,165 B1 | 7/2003 | Kuroda |
| 6,587,856 B1 | 7/2003 | Srinivasan et al. |
| 6,593,853 B1 | 7/2003 | Barrett et al. |
| 6,600,418 B2 | 7/2003 | Francis et al. |
| 6,607,123 B1 | 8/2003 | Jollifee et al. |
| 6,608,551 B1 | 8/2003 | Anderson et al. |
| 6,608,561 B2 | 8/2003 | Lawler, Jr. et al. |
| 6,612,495 B2 | 9/2003 | Reddersen et al. |
| 6,617,962 B1 | 9/2003 | Horwitz et al. |
| 6,621,417 B2 | 9/2003 | Duncan et al. |
| 6,622,567 B1 | 9/2003 | Hamel et al. |
| 6,641,042 B1 | 11/2003 | Pierenkemper et al. |
| 6,650,227 B1 | 11/2003 | Bradin |
| 6,664,897 B2 | 12/2003 | Pape et al. |
| 6,669,089 B2 | 12/2003 | Cybulski et al. |
| 6,672,512 B2 | 1/2004 | Bridgelall |
| 6,677,852 B1 | 1/2004 | Landt |
| 6,685,059 B2 | 2/2004 | Jones et al. |
| 6,687,293 B1 | 2/2004 | Loyer et al. |
| 6,693,539 B2 | 2/2004 | Bowers et al. |
| 6,700,533 B1 | 3/2004 | Werb et al. |
| 6,700,931 B1 | 3/2004 | Lee et al. |
| 6,707,376 B1 | 3/2004 | Patterson et al. |
| 6,712,276 B1 | 3/2004 | Abali et al. |
| 6,714,121 B1 | 3/2004 | Moore |
| 6,724,308 B2 | 4/2004 | Nicholson |
| 6,726,099 B2 | 4/2004 | Becker et al. |
| 6,745,008 B1 | 6/2004 | Carrender et al. |
| 6,747,560 B2 | 6/2004 | Stevens, III |
| 6,750,769 B1 | 6/2004 | Smith |
| 6,752,277 B1 | 6/2004 | Sempliner |
| 6,784,789 B2 | 8/2004 | Eroglu et al. |
| 6,784,813 B2 | 8/2004 | Shanks et al. |
| 6,791,603 B2 | 9/2004 | Lazo et al. |
| 6,793,127 B2 | 9/2004 | Alsafadi et al. |
| 6,802,659 B2 | 10/2004 | Cremon et al. |
| 6,808,116 B1 | 10/2004 | Eslambolchi |
| 6,809,646 B1 | 10/2004 | Lee |
| 6,812,824 B1 | 11/2004 | Goldinger et al. |
| 6,812,838 B1 | 11/2004 | Maloney |
| 6,812,841 B2 | 11/2004 | Heinrich et al. |
| 6,816,817 B1 | 11/2004 | Retlich |
| 6,828,902 B2 | 12/2004 | Casden |
| 6,842,106 B2 | 1/2005 | Hughes et al. |
| 6,847,856 B1 | 1/2005 | Bohannon |
| 6,853,294 B1 | 2/2005 | Ramamurthy et al. |
| 6,853,303 B2 | 2/2005 | Chen et al. |
| 6,859,757 B2 | 2/2005 | Muehl et al. |
| 6,870,797 B2 | 3/2005 | Reasoner et al. |
| 6,873,260 B2 | 3/2005 | Lancos et al. |
| 6,878,896 B2 | 4/2005 | Braginsky et al. |
| 6,879,809 B1 | 4/2005 | Vega et al. |
| 6,888,459 B2 | 5/2005 | Stilp |
| 6,897,763 B2 | 5/2005 | Schulmerich et al. |
| 6,899,476 B1 | 5/2005 | Barrus et al. |
| 6,901,304 B2 | 5/2005 | Swan et al. |
| 6,903,656 B1 | 6/2005 | Lee |
| 6,917,291 B2 | 7/2005 | Allen |
| 6,918,541 B2 | 7/2005 | Knowles et al. |
| 6,929,412 B1 | 8/2005 | Barrus et al. |
| 6,935,560 B2 | 8/2005 | Andreasson et al. |
| 6,940,408 B2 | 9/2005 | Ferguson et al. |
| 6,943,678 B2 | 9/2005 | Muirhead |
| 6,943,688 B2 | 9/2005 | Chung et al. |
| 6,945,721 B2 | 9/2005 | Sato |
| 6,967,579 B1 | 11/2005 | Elizondo |
| 6,975,229 B2 | 12/2005 | Carrender et al. |
| 6,992,574 B2 | 1/2006 | Aupperle et al. |

| | | |
|---|---|---|
| 6,999,955 B1 | 2/2006 | Horvitz |
| 7,023,342 B2 | 4/2006 | Corbett et al. |
| 7,036,729 B2 | 5/2006 | Chung |
| 7,057,509 B2 | 6/2006 | Gualdi et al. |
| 7,061,379 B2 | 6/2006 | Chen et al. |
| 7,066,388 B2 | 6/2006 | He |
| 7,066,667 B2 | 6/2006 | Chapman et al. |
| 7,069,100 B2 | 6/2006 | Monette et al. |
| 7,073,712 B2 | 7/2006 | Jusas et al. |
| 7,075,412 B1 | 7/2006 | Reynolds et al. |
| 7,079,023 B2 | 7/2006 | Haller |
| 7,084,769 B2 | 8/2006 | Bauer et al. |
| 7,091,861 B2 | 8/2006 | Schmidtberg et al. |
| 7,114,655 B2 | 10/2006 | Chapman et al. |
| 7,127,507 B1 | 10/2006 | Clark et al. |
| 7,135,976 B2 | 11/2006 | Neff et al. |
| 7,151,456 B2 | 12/2006 | Godfrey |
| 7,165,722 B2 | 1/2007 | Shafer et al. |
| 7,183,922 B2 | 2/2007 | Mendolia et al. |
| 7,187,288 B2 | 3/2007 | Mendolia et al. |
| 7,194,072 B2 | 3/2007 | Gamble |
| 7,195,159 B2 | 3/2007 | Sloan et al. |
| 7,197,279 B2 | 3/2007 | Bellantoni |
| 7,212,637 B2 | 5/2007 | Salisbury |
| 7,221,258 B2 | 5/2007 | Lane et al. |
| 7,230,730 B2 | 6/2007 | Owen et al. |
| 7,240,027 B2 | 7/2007 | McConnell et al. |
| 7,272,502 B2 | 9/2007 | Lee et al. |
| 7,292,963 B2 | 11/2007 | Bornhoevd et al. |
| 7,317,394 B2 | 1/2008 | Koh et al. |
| 7,336,153 B2 | 2/2008 | Malone et al. |
| 7,336,167 B2 | 2/2008 | Olsen, III et al. |
| 7,336,243 B2 | 2/2008 | Jo et al. |
| 7,339,476 B2 | 3/2008 | Macurek et al. |
| 7,345,576 B2 | 3/2008 | Allen et al. |
| 7,373,087 B2 | 5/2008 | Shi et al. |
| 7,388,491 B2 | 6/2008 | Chand et al. |
| 7,389,921 B2 | 6/2008 | Lin et al. |
| 7,486,181 B2 | 2/2009 | Olsen et al. |
| 7,510,110 B2 | 3/2009 | Pietrzyk et al. |
| 7,520,429 B2 | 4/2009 | Koster |
| 7,551,081 B2 | 6/2009 | Vrba et al. |
| 7,616,117 B2 | 11/2009 | Streeb et al. |
| 7,720,438 B2 | 5/2010 | Rowse |
| 7,764,191 B2 | 7/2010 | Hall et al. |
| 2001/0000019 A1 | 3/2001 | Bowers et al. |
| 2001/0008390 A1 | 7/2001 | Berquist |
| 2001/0015760 A1 | 8/2001 | Fellegara et al. |
| 2002/0005774 A1 | 1/2002 | Rudolph |
| 2002/0030597 A1 | 3/2002 | Muirhead |
| 2002/0067265 A1 | 6/2002 | Rudolph |
| 2002/0070862 A1 | 6/2002 | Francis et al. |
| 2002/0130778 A1 | 9/2002 | Nicholson |
| 2002/0143320 A1 | 10/2002 | Levin |
| 2002/0155843 A1 | 10/2002 | Bahl et al. |
| 2002/0165758 A1 | 11/2002 | Hind et al. |
| 2002/0167397 A1 | 11/2002 | Eroglu et al. |
| 2002/0185532 A1 | 12/2002 | Berquist et al. |
| 2003/0007473 A1 | 1/2003 | Strong et al. |
| 2003/0023337 A1 | 1/2003 | Godfrey et al. |
| 2003/0071731 A1 | 4/2003 | Jesme |
| 2003/0102367 A1 | 6/2003 | Monette et al. |
| 2003/0109951 A1 | 6/2003 | Hsiung et al. |
| 2003/0126103 A1 | 7/2003 | Chen et al. |
| 2003/0150908 A1 | 8/2003 | Pokorny et al. |
| 2003/0169149 A1 | 9/2003 | Ohki et al. |
| 2003/0203730 A1 | 10/2003 | Wan et al. |
| 2003/0210142 A1 | 11/2003 | Freathy et al. |
| 2003/0216969 A1 | 11/2003 | Bauer et al. |
| 2003/0225635 A1 | 12/2003 | Renz et al. |
| 2004/0008123 A1 | 1/2004 | Carrender et al. |
| 2004/0024570 A1 | 2/2004 | Muehl et al. |
| 2004/0024644 A1 | 2/2004 | Gui et al. |
| 2004/0032443 A1 | 2/2004 | Moylan |
| 2004/0046642 A1 | 3/2004 | Becker et al. |
| 2004/0061324 A1 | 4/2004 | Howard |
| 2004/0062294 A1 | 4/2004 | Clemens et al. |
| 2004/0066281 A1 | 4/2004 | Hughes et al. |
| 2004/0069851 A1 | 4/2004 | Grunes |
| 2004/0084526 A1 | 5/2004 | Knowles et al. |
| 2004/0095910 A1 | 5/2004 | Metts et al. |
| 2004/0108378 A1 | 6/2004 | Gatz |
| 2004/0124988 A1 | 7/2004 | Leonard et al. |
| 2004/0160324 A1 | 8/2004 | Stilp |
| 2004/0181467 A1 | 9/2004 | Raiyani et al. |
| 2004/0189443 A1 | 9/2004 | Eastburn |
| 2004/0220860 A1 | 11/2004 | Persky et al. |
| 2004/0252025 A1 * | 12/2004 | Silverbrook et al. ...... 340/568.5 |
| 2005/0012613 A1 | 1/2005 | Eckstein et al. |
| 2005/0021369 A1 | 1/2005 | Cohen et al. |
| 2005/0028417 A1 | 2/2005 | Kim |
| 2005/0035849 A1 | 2/2005 | Yizhack |
| 2005/0040934 A1 | 2/2005 | Shanton |
| 2005/0052283 A1 | 3/2005 | Collins et al. |
| 2005/0058483 A1 | 3/2005 | Chapman et al. |
| 2005/0062603 A1 | 3/2005 | Fuerst et al. |
| 2005/0068179 A1 | 3/2005 | Roesner |
| 2005/0083180 A1 | 4/2005 | Horwitz |
| 2005/0088299 A1 | 4/2005 | Bandy et al. |
| 2005/0092825 A1 | 5/2005 | Cox et al. |
| 2005/0093678 A1 | 5/2005 | Forster et al. |
| 2005/0093703 A1 | 5/2005 | Twitchell |
| 2005/0099268 A1 | 5/2005 | Juels et al. |
| 2005/0110641 A1 | 5/2005 | Mendolia et al. |
| 2005/0135181 A1 | 6/2005 | Shionoiri et al. |
| 2005/0140511 A1 | 6/2005 | Bonnell et al. |
| 2005/0143026 A1 | 6/2005 | Bellantoni |
| 2005/0143916 A1 | 6/2005 | Kim et al. |
| 2005/0145688 A1 | 7/2005 | Milenkovic et al. |
| 2005/0149414 A1 | 7/2005 | Schrodt et al. |
| 2005/0154572 A1 | 7/2005 | Sweeney |
| 2005/0155213 A1 | 7/2005 | Eastin |
| 2005/0159913 A1 | 7/2005 | Ariyoshi et al. |
| 2005/0162256 A1 | 7/2005 | Kinoshita |
| 2005/0170784 A1 | 8/2005 | Ariyoshi et al. |
| 2005/0177423 A1 | 8/2005 | Swanson |
| 2005/0177466 A1 | 8/2005 | Willins |
| 2005/0179521 A1 | 8/2005 | Pillai et al. |
| 2005/0180566 A1 | 8/2005 | Ryal |
| 2005/0188095 A1 | 8/2005 | Gardiner et al. |
| 2005/0190098 A1 | 9/2005 | Bridgelall et al. |
| 2005/0192727 A1 | 9/2005 | Shostak et al. |
| 2005/0197775 A1 | 9/2005 | Smith |
| 2005/0200457 A1 | 9/2005 | Bridgelall et al. |
| 2005/0206552 A1 | 9/2005 | Friedrich |
| 2005/0206555 A1 | 9/2005 | Bridgelall et al. |
| 2005/0212660 A1 | 9/2005 | Hansen et al. |
| 2005/0212673 A1 | 9/2005 | Forster |
| 2005/0212676 A1 | 9/2005 | Steinberg |
| 2005/0219039 A1 | 10/2005 | Allen |
| 2005/0228528 A1 | 10/2005 | Farchmin et al. |
| 2005/0237162 A1 | 10/2005 | Hyde et al. |
| 2005/0240305 A1 | 10/2005 | Bogash et al. |
| 2005/0241548 A1 | 11/2005 | Muirhead |
| 2005/0253717 A1 | 11/2005 | Howarth et al. |
| 2005/0253718 A1 | 11/2005 | Droms et al. |
| 2005/0258955 A1 | 11/2005 | Gloekler et al. |
| 2005/0264401 A1 | 12/2005 | Haller et al. |
| 2005/0269407 A1 | 12/2005 | Harmon |
| 2006/0006231 A1 | 1/2006 | Anson et al. |
| 2006/0027658 A1 | 2/2006 | Genc et al. |
| 2006/0038077 A1 | 2/2006 | Olin et al. |
| 2006/0049250 A1 | 3/2006 | Sullivan |
| 2006/0053234 A1 | 3/2006 | Kumar et al. |
| 2006/0055508 A1 | 3/2006 | Kumar et al. |
| 2006/0060657 A1 | 3/2006 | Choong et al. |
| 2006/0071774 A1 | 4/2006 | Brown et al. |
| 2006/0097873 A1 | 5/2006 | Vrba et al. |
| 2006/0108411 A1 | 5/2006 | Macurek et al. |
| 2006/0125653 A1 | 6/2006 | McQuade |
| 2006/0125694 A1 | 6/2006 | Dejanovic et al. |
| 2006/0145850 A1 | 7/2006 | Krstulich |
| 2006/0170565 A1 | 8/2006 | Husak et al. |
| 2006/0200256 A1 | 9/2006 | Mason et al. |
| 2006/0208859 A1 | 9/2006 | Hougen et al. |
| 2006/0232382 A1 | 10/2006 | Bauer et al. |
| 2006/0250248 A1 | 11/2006 | Tu et al. |
| 2006/0279412 A1 | 12/2006 | Holland et al. |

| | | | |
|---|---|---|---|
| 2007/0008073 | A1 | 1/2007 | Poasevara |
| 2007/0013517 | A1 | 1/2007 | Posamentier |
| 2007/0013519 | A1 | 1/2007 | Chung et al. |
| 2007/0018820 | A1 | 1/2007 | Chand et al. |
| 2007/0035396 | A1 | 2/2007 | Chand et al. |
| 2007/0040681 | A1 | 2/2007 | Jessup |
| 2007/0055470 | A1 | 3/2007 | Pietrzyk et al. |
| 2007/0063029 | A1 | 3/2007 | Brandt et al. |
| 2007/0075128 | A1 | 4/2007 | Hall et al. |
| 2007/0075832 | A1 | 4/2007 | Morse et al. |
| 2007/0137531 | A1 | 6/2007 | Muirhead |
| 2007/0159311 | A1 | 7/2007 | Schober |
| 2007/0159331 | A1 | 7/2007 | Zegelin |
| 2007/0205860 | A1 | 9/2007 | Jones et al. |
| 2007/0205861 | A1 | 9/2007 | Nair et al. |
| 2008/0118378 | A1 | 5/2008 | Baron et al. |
| 2008/0278328 | A1 | 11/2008 | Chand et al. |
| 2009/0206154 | A1 | 8/2009 | Pietrzyk et al. |
| 2009/0254199 | A1 | 10/2009 | Vrba et al. |

FOREIGN PATENT DOCUMENTS

| | | |
|---|---|---|
| CN | 1801714 A | 7/2006 |
| CN | 1952950 A | 4/2007 |
| CN | 101300609 A | 11/2008 |
| CN | 101356543 A | 1/2009 |
| CN | 100512117 C | 7/2009 |
| DE | 10314260 A1 | 10/2004 |
| EP | 1542105 A | 6/2005 |
| EP | 1 557 806 A2 | 7/2005 |
| EP | 1 657 609 A1 | 11/2005 |
| EP | 1 657 606 A1 | 5/2006 |
| EP | 1 750 185 A2 | 2/2007 |
| EP | 1 752 908 A2 | 2/2007 |
| EP | 1 772 812 A2 | 4/2007 |
| EP | 1 657 609 B1 | 3/2010 |
| WO | 0016289 | 3/2000 |
| WO | 0058752 | 10/2000 |
| WO | 0169516 | 9/2001 |
| WO | 01/82009 A2 | 11/2001 |
| WO | 02073523 | 9/2002 |
| WO | 02/101670 A2 | 12/2002 |
| WO | 03056403 A | 7/2003 |
| WO | 03056469 A | 7/2003 |
| WO | 2004/040387 A | 5/2004 |
| WO | 2005045743 A | 5/2005 |
| WO | 2005098737 A2 | 10/2005 |
| WO | 2007 021648 A2 | 2/2007 |
| WO | 2007/030394 A | 3/2007 |
| WO | 2007/030544 A2 | 3/2007 |
| WO | 2007/030544 A3 | 3/2007 |
| WO | 2008063553 A2 | 5/2008 |

OTHER PUBLICATIONS

OA Dated Aug. 28, 2008 for U.S. Appl. No. 11/129,199, 28 pages.
OA Dated May 30, 2008 for U.S. Appl. No. 11/222,256, 60 pages.
OA Dated Apr. 28, 2008 for U.S. Appl. No. 11/220,130, 29 pages.
OA Dated Apr. 30, 2008 for U.S. Appl. No. 11/185,114, 80 pages.
CN OA due Apr. 1, 2008 for Chinese Patent Application No. 200510137387.6, 21 pages.
OA dated Jan. 7, 2010 for U.S. Appl. No. 12/040,305, 78 pages.
European Search Report dated Nov. 20, 2009 for European Patent Application No. EP 06 80 3042, 7 pages.
OA dated Dec. 24, 2009 for U.S. Appl. No. 12/140,118, 76 pages.
OA dated Jan. 27, 2010 for U.S. Appl. No. 11/185,114, 88 pages.
OA dated Jan. 13, 2010 for U.S. Appl. No. 12/263,750, 16 pages.
Final OA mailed Mar. 1, 2010 for U.S. Appl. No. 11/239,959, 29 pages.
European Search Report dated Feb. 6, 2006 mailed Feb. 20, 2006 for European Patent Application U.S. Appl. No. 10/985,173, 3 pages.
European Search Report dated Feb. 14, 2006 mailed Feb. 20, 2006 for European Patent Application U.S. Appl. No. 10/985,621, 3 pages.
OA Dated Jan. 30, 2009 for U.S. Appl. No. 11/129,199, 32 pages.
OA Dated Nov. 28, 2008 for U.S. Appl. No. 11/239,959, 75 pages.
OA Dated Jan. 12, 2009 for U.S. Appl. No. 11/184,233, 359 pages.
OA Dated Mar. 19, 2009 for U.S. Appl. No. 11/220,130, 18 pages.
OA Dated Nov. 24, 2008 for U.S. Appl. No. 11/220,130, 36 pages.
OA Dated Sep. 18, 2008 for U.S. Appl. No. 11/190,143, 22 pages.
OA Dated Mar. 26, 2009 for U.S. Appl. No. 11/200,915, 70 pages.
OA Dated Sep. 30, 2008 for U.S. Appl. No. 11/230,758, 63 pages.
OA Dated Feb. 6, 2009 for U.S. Appl. No. 11/241,421, 14 pages.
OA Dated Oct. 2, 2008 for U.S. Appl. No. 11/185,114, 42 pages.
International Search Report for PCT Application Serial No. PCT/US06/34721 mailed 4/26/07, 1 page.
OA Dated Apr. 16, 2009 for U.S. Appl. No. 11/230,758, 26 pages.
OA Dated Apr. 21, 2009 for U.S. Appl. No. 11/190,143, 19 pages.
Partial International Search Report dated Mar. 30, 2006, for PCT Application Serial No. PCT/EP2005/007878, 3 pages.
International Search Report for PCT Application Serial No. PCT/US06/34290, mailed Feb. 5, 2008, 2 pages.
International Search Report for International Patent Application Serial No. PCT/EP2005/007878, mailed May 17, 2006, 8 pages.
M. Karkkainen, et al. "The product centric approach: a solution to supply network information management problems?" Computers in Industry, Elsevier Science Publishers. Amsterdam, NL, vol. 52, No. 2, Oct. 2003.
CN OA Dispatched Jul. 4, 2008 for Chinese Application No. 200610141407.1, 12 pages.
EPOA dated Mar. 19, 2009 for European Patent Application No. 05 776 159.5, 3 pages.
EPOA dated Aug. 20, 2008 for European Patent Application No. 05 776 159.5, 3 pages.
International Search Report dated May 17, 2006 for PCT Application No. PCT/EP2005/007878, 8 pages.
OA dated Jun. 4, 2009 for U.S. Appl. No. 11/185,114, 95 pages.
OA dated May 14, 2009 for U.S. Appl. No. 11/239,959, 37 pages.
OA dated Jun. 23, 2010 for U.S. Appl. No. 12/040,305, 30 pages.
OA dated Jun. 18, 2010 for U.S. Appl. No. 12/140,118, 13 pages.
OA Dated Jul. 8, 2010 for U.S. Appl. No. 11/200,915, 52 pages.
International Search Report mailed Jun. 5, 2008 for PCT Application No. PCT/US2007/024049, 1 page.
European Search Report dated Jun. 9, 2008 for European Patent Application No. EP 06 02 0479, 2 pages.
International Search Report mailed Mar. 14, 2007 for PCT Application No. PCT/US2006/030751, 2 pages.
Partial European Search Report dated Nov. 3, 2008 for European Patent Application No. EP 06 01 5620, 5 pages.
OA dated Apr. 15, 2010 for U.S. Appl. No. 11/241,421, 23 pages.
OA dated Mar. 1, 2010 for U.S. Appl. No. 11/239,959, 29 pages.
CN OA dated Aug. 13, 2010 for Chinese Application No. 200680029337.9, 7 pages.
OA dated Aug. 21, 2009 for U.S. Appl. No. 11/239,959, 34 pages.
OA Dated Jul. 28, 2009 for U.S. Appl. No. 11/220,130, 32 pages.
OA dated Jul. 30, 2009 for U.S. Appl. No. 12/263,750, 65 pages.
OA Dated Aug. 26, 2009 for U.S. Appl. No. 11/241,421, 24 pages.
OA dated Sep. 21, 2009 for U.S. Appl. No. 11/190,143, 27 pages.
OA dated Oct. 8, 2009 for U.S. Appl. No. 11/200,915, 41 pages.
OA dated Oct. 27, 2009 for U.S. Appl. No. 11/230,758, 39 pages.
OA dated Oct. 25, 2010 for U.S. Appl. No. 12/040,305, 23 pages.
OA dated Dec. 22, 2010 for U.S. Appl. No. 11/200,915 27 pages.

* cited by examiner

SYSTEMS AND METHODS THAT INTEGRATE RADIO FREQUENCY IDENTIFICATION (RFID) TECHNOLOGY WITH AGENT-BASED CONTROL SYSTEMS

RELATED APPLICATIONS

This application is a Divisional of U.S. patent application Ser. No. 10/985,173, filed Nov. 10, 2004 now U.S. Pat. No. 7,551,081 and entitled SYSTEMS AND METHODS THAT INTEGRATE RADIO FREQUENCY IDENTIFICATION (RFID) TECHNOLOGY WITH AGENT-BASED CONTROL SYSTEMS, which is related to U.S. patent application Ser. No. 10/985,621, filed on Nov. 10, 2004 now U.S. Pat. No. 7,339,476 and entitled "SYSTEMS AND METHODS THAT INTEGRATE RADIO FREQUENCY IDENTIFICATION (RFID) TECHNOLOGY WITH INDUSTRIAL CONTROLLERS," the entirety of which is incorporated herein by reference.

TECHNICAL FIELD

The subject invention relates to industrial control systems and, more particularly, to systems and methods that employ radio frequency identification (RFID) technology in connection with agent-based control systems.

BACKGROUND OF THE INVENTION

Radio Frequency Identification (RFID) is an emerging technology that leverages electronic data and wireless communication for identification purposes and can be utilized with systems from secure internet payment systems to industrial automation and access control systems. With RFID systems, electronic data typically is stored within an RFID tag, which can be formed from a small silicon chip and one or more antennas, and affixed to a product. Reading from and/or writing to an RFID tag can be achieved through radio frequency (RF) based wireless communication via devices referred to as RFID readers. In general, writing is utilized to add and/or modify product specific information to an RFID tag, and reading is utilized to retrieve the information, for example, to provide for automatic product identification. In many instances, the electronic data written to and/or read from an RFID tag includes an Electronic Product Code (EPC), which, in general, is a unique number that is encoded (e.g., as a bit code) and embedded within the RFID tag. Typical EPC data can include information about the product (e.g., product type, date of manufacture, lot number, etc.) and/or associated cases, pallets, and/or container levels, for example.

When passed through or scanned by a reader, an RFID tag emits stored electronic data such that the data can be retrieved by an RFID reader without unpacking the product or scanning barcode labels. Read information can be utilized to provide a greater degree of certainty over what goes into a supply chain and/or how to manage raw materials, warehouse inventory, shipments, logistics, and/or various other aspects of manufacturing. Conventionally, RFID readers convey electronic data obtained from RFID tags to a PC based server (e.g., the Savant-like server) that performs data filtering and management and provides interfaces to other Enterprise Applications.

As note above, RFID technology can be utilized in industrial automation systems. An example of such a system is agent-based manufacturing control systems, which are evolving into robust control systems for large series production control systems. In general, an agent-based control system is a community of autonomous, intelligent computational units referred to as agents. Respective agents typically are responsible for local decision making and control of one or more explicit parts of a manufacturing process. A key element in such a system is cooperation among the agents in order to provide a desirable global behavior of controlled systems and/or processes. Cooperation between the agents typically is based on communication via transmitting messages following various interaction and negotiation scenarios and/or protocols.

With ever shorter product life-cycles, decreasing product launch times, and increasing product variety, conventional manufacturing processes need to provide more product flexibility and higher volume scalability while maintaining high product quality and low manufacturing costs. Agent technology is well suited to addressing the control aspects of these manufacturing requirements. As autonomous decision-makers, agents are able to dynamically react to unforeseen events, exploit different capabilities of components, and/or adapt flexibly to changes in their environment. The ability of agents to adapt their behavior at run-time reduces the need for the designer to foresee possible scenarios and changes that the system will encounter; agents can automatically adapt to changing products or varying volumes.

Although RFID technology can be utilized to facilitate agent-based control systems, there is a need to provide improved techniques to integrate this technology with such control systems.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

The systems and methods of the subject invention provide novel techniques that integrate Radio Frequency Identification (RFID) technology with agent-based control systems through a mediation component (or agent), which obtains electronic data (e.g., electronic product data such as Electronic Product Code (EPC) data) from the physical reader(s) and/or a server and provides the data to other agents via agent communication protocols. The systems and methods of the subject invention employ a component that collects, processes, and stores the electronic data received from the readers and/or servers. The component collects the electronic data through corresponding reader (e.g., via a plug-in) and/or various server interfaces. This data can be filtered (e.g., to accept data associated with particular electronic data and to mitigate accepting duplicate electronic data), processed to a format suitable to the agents, and stored. Such storage can include delineating related electronic data by rows of a table and type of data by columns of the table. Upon receiving a subscription and/or request from an agent for electronic data, the component can obtain and convey the information to the agent.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
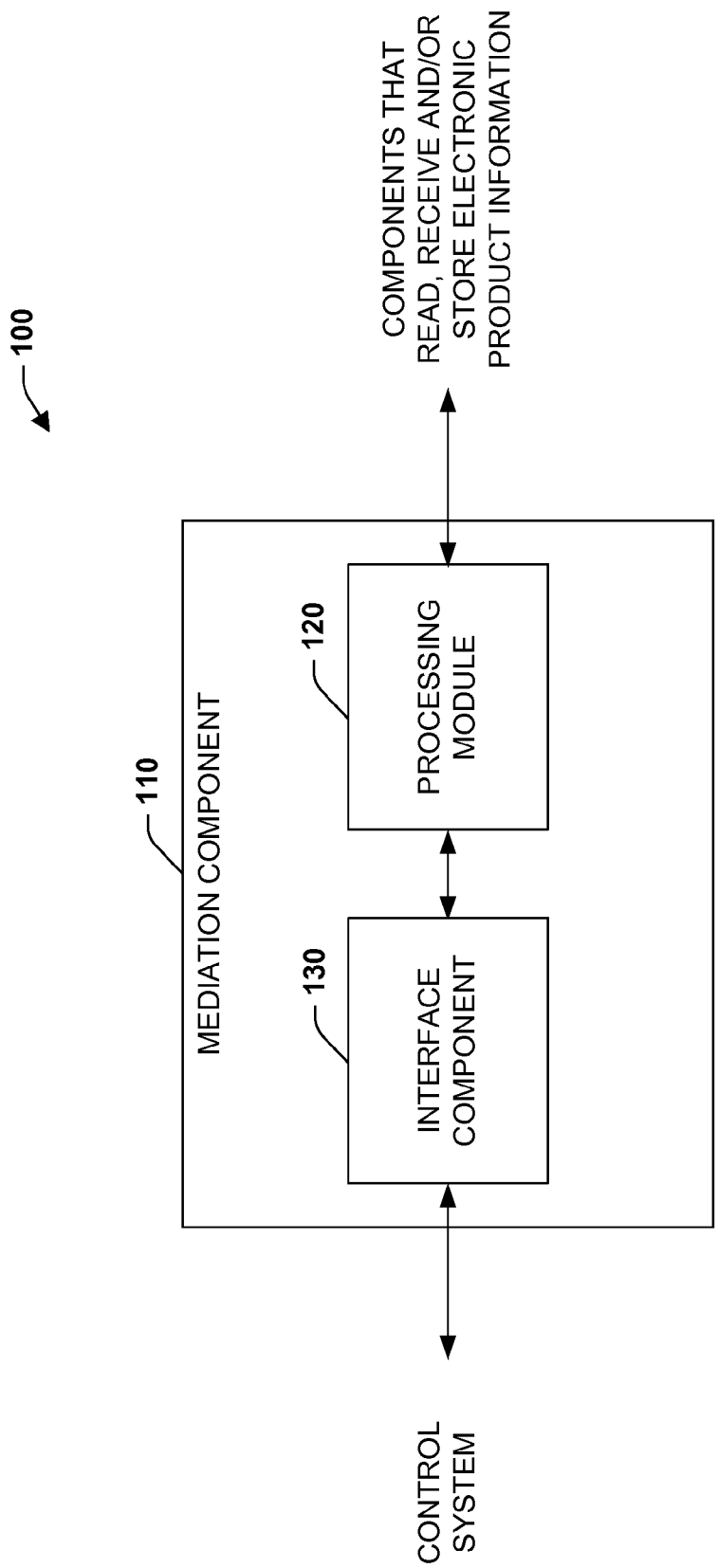
FIG. 1 illustrates an exemplary mediation component that receives and provides information in a control system.

As utilized in this application, terms "component," "agent," "module," "system," "controller," "device," and variants thereof are intended to refer to a computer-related entities, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

The subject invention facilitates distribution of electronic data (e.g., Electronic Product Code (EPC) data and various other data) obtained by Radio Frequency Identification (RFID) readers from RFID tags and/or from servers to one or more agents within an agent-based control system. The systems and methods of the subject invention employ an agent mediation component that collects, processes, and stores electronic data and provides the stored electronic data, via inter-agent communication mechanisms, to the other agents in a multi-agent control system. Such systems typical are a community of autonomous, intelligent computational units referred to as agents, wherein respective agents are responsible for decision making and control of various acts of a manufacturing process and cooperate amongst the agents to provide a global behavior. The mediation component can execute in connection with one or more of the agents and/or a dedicated agent, for example, within a microprocessor-based device such as a computer, an industrial controller, a hardware module on backplane, and the like.

The subject invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that manages electronic product information (or data) within an industrial control system. The system 100 includes a mediation component 110 that facilitates electronic product data exchange (e.g., bi-directional) between components that read, receive and/or store electronic product data and various entities of the control system. The mediation component 110 includes a processing module 120, which provides one or more interfaces to the various components that read, receive and/or store electronic product data, such as, readers (e.g., RFID) and/or servers. These interfaces generally are utilized to exchange electronic product data (e.g., EPC related data) between the mediation component 110 and the components. Such data can include unprocessed (e.g., raw data) and/or processed (e.g., filtered and formatted) electronic product information as described in detail below. The interfaces can be based on wire and/or wireless technologies, and suitable technologies include Ethernet (e.g., 10BASE-T, 100BASE-T and 1000BASE-T), serial port (e.g., RS-232 and RS-422), parallel port, coaxial cable, Universal Serial Bus (USB), Firewire, and the like.

The processing module 120 can obtain the electronic product data via receiving data pushed by and/or pulled from the readers and/or servers. In one example, the readers can periodically transmit electronic product data, which can be received by the processing module 120. It is to be appreciated that the processing module 120 can selectively accept such data. For example, the processing module 120 can determine whether available electronic product data is associated with the control system of interest and accept data that this associated with the control system and ignore, discard, deny . . . data that is not associated with the control system. This discrimination can be facilitated by filters or other software and/or hardware that pass desired and block remaining data. Alternatively and/or additionally, intelligence can be utilized to facilitate the selection of suitable electronic product data. In this instance, the intelligence can employ machine learning techniques that utilize statistics, probabilities, inferences, classifiers, etc. to render a decision as to whether electronic product data should be accepted. In another example, the processing module 120 can transmit a message to one or more readers that indicates it is ready to receive electronic product data. In yet another example, the processing module 120 can request (e.g., query) and/or retrieve electronic product data from servers. It is to be appreciated that electronic product data obtained by the processing module 120 can be in the form of a data stream, one or more data bursts and/or one or more data packets. In addition, the electronic product data can be compressed, encrypted, encoded, modulated within a carrier envelope, protected (e.g., password), etc.

Upon receiving electronic product data, the processing module 120 can operate on the data. For example, the processing module 120 can filter, parse, and/or format the electronic product data. In addition, the processing module 120 can selectively extract and/or discard portions of the electronic product data. Where the data is compressed, encrypted, encoded, modulated, protected, etc. the processing component 120 can act on the electronic product data in this state and/or decompress, decrypt, decode, demodulate, unprotect, etc. it prior to acting on it. In addition, the processing module 120 can store the electronic product data, for example, within local and/or remote storage components. For example, the mediation component 110 and/or the processing module 120 can include various volatile and/or non-volatile memory, and the electronic product data can be stored within such memory. Alternatively and/or additionally this memory can reside remote from the mediation component 110. It is to be appreciated that the electronic product data can be variously stored. For example, the data can be stored in records of a database as described in detail below in connection with FIG. 4. Stored electronic product data can be conveyed to an interface component 130. The interface component 130 can provide communication interfaces to convey at least a portion of the electronic product data to the one or more of the entities of the control system. Such interfaces can include essentially any interface, including subscribe and query based interfaces that enable an entity to subscribe to receive electronic product data and/or a signal quality indictor when such data becomes available and/or query saved electronic product data.

It is to be appreciated that the mediation component 110 can be integrated within control systems. In one instance, the mediation component 110 can be another entity of the control system and, thus, additionally provides functionality that facilitates control system operation. In another instance, the mediation component 110 can be an additional component that facilitates electronic product data exchange as described herein. By way of example, the mediation component 110 can facilitate inter-entity (inter-agent) negotiations in a conveyor-based transportation system, wherein the mediation component 110 can be employed in connection with diverter entities that navigate (e.g., switch) products between conveyor tracks. In one instance, a diverter entity subscribes to the mediation component 110 to receive electronic product data (e.g., EPCs and related data) of incoming products, wherein the processing component 120 collects the electronic product data from physical readers residing proximate the diverter entity. Products typically are linked with a product entity that is registered in the control system under the identity of a corresponding electronic product data. The diverter entity, after receiving the electronic product data from the mediation component 120 can communicate with the product entity and query for a product destination in order to suitably navigate the product and/or other product related information.

It is to be appreciated that the mediation component 110, the processing component 120 and/or the interface component 130 can be software and/or hardware based. For example, these components can be implemented in essentially any programming language, such as, for example, C or Java based languages. In addition, a markup language such as Extensible Markup Language (XML) and/or Physical Markup Language (PML) can be utilized to define a system configuration, which can include information on mapping between logical-physical readers, available filters, etc.

Figure 2:
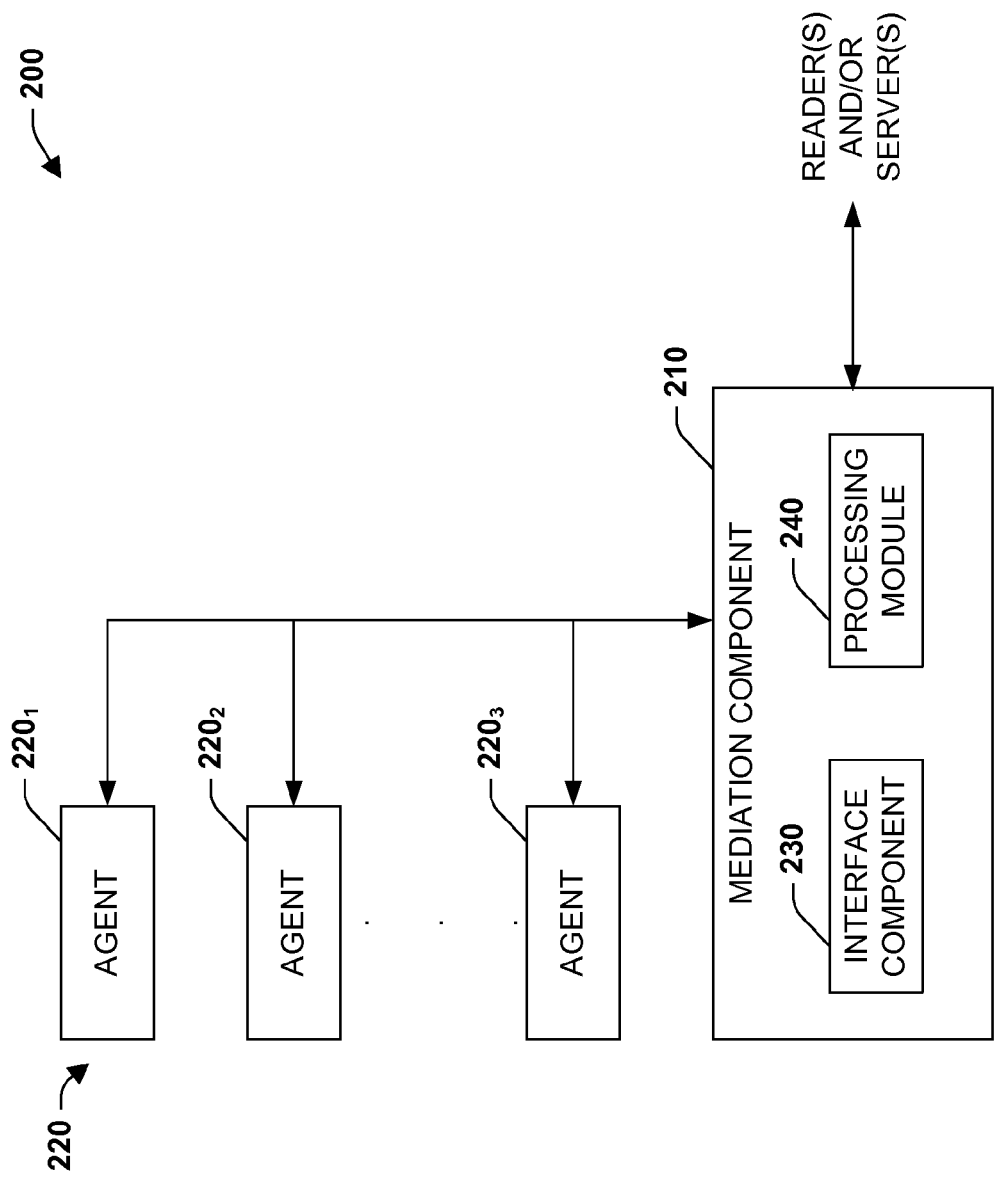
FIG. 2 illustrates an exemplary agent mediation component that facilitates distribution of RFID tag information to one or more agents in an agent-based control system.

FIG. 2 illustrates an agent-based control system 200 that employs a mediation component 210 to distribute electronic product data such as EPC data to a community of autonomous, intelligent computational units, or agents $220_1$, $220_2$ and $220_3$, collectively referred to as the agents 220. In addition, the system enables any of the agents 220 to send commands (e.g., through appropriate system components) to instruct electronic product data readers, for example, to switch a reader ON or OFF, to write a tag or data, etc. As depicted, the system 200 includes the three agents $220_1$, $220_2$ and $220_3$; however it is to be appreciated that the system 200 can employ any number of agents, for example, depending on the task(s) performed by the control system 200. Three agents are illustrated within this example for sake of brevity and explanatory purposes. Respective agents 220 can be responsible for local decision making and control of explicit and/or implicit acts within a control process. In such a system, the agents 220 typically cooperate to provide a desirable global behavior of the controlled system and/or process. Typically, cooperation between the agents 220 is based on communication via sending messages following various interaction and negotiation scenarios and/or protocols.

The mediation component 210 works in concert with the agents 220, collects and stores electronic data, and provides this data to the agents 220 via inter-agent communication mechanisms. The mediation component 210 can reside and execute within essentially any microprocessor based device. For example, the mediation component 210 can run within a personal computer, a laptop, a human interface machine, a handheld computer, a workstation, any of the agents 220, a programmable logic controller, a hardware module, a software module, firmware, a state machine, a microprocessor, etc. In addition, the mediation component 210 can be distributed and execute across systems in a distributed environment. The mediation component 210 can be integrated in the community of agents 220 to coordinate inter-agent negotiation processes regarding product or semi-product EPCs.

An interface component 230 typically communicates electronic data to the agents 220 through inter-agent communication mechanisms (e.g., a Subscribe Interaction Protocol such as FIPA, ACS/JDL, etc.) to subscribe to receive electronic data from the mediation component 210 whenever electronic data is received by the mediation component 210. In addition, the agents 220 can subscribe to receive a signal quality indicator associated with received electronic data and/or other environmental information. The signal quality indicator and/or the other environmental information can be utilized to resolve the source of the electronic data (e.g., the Radio Frequency Identification (RFID) tag that emitted the electronic data) and the location thereof. Additionally, any of the agents 220 can query the mediation component 210 to obtain historical data, for example, electronic data read within a particular time period (e.g., between timestamps), signal quality indicators read within a particular time period (e.g., between timestamps), timestamps corresponding to a particular electronic data, signal quality indicators corresponding to a particular electronic data, etc. Such data can be provided by the mediation component 210 to a subscriber(s) and/or requestor(s) agent as a list of records as described in detail below.

A processing module 240 provides one or more interfaces (e.g., reader and server interfaces) to RFID based readers, which obtain EPC data and/or other electronic data from RFID tags affixed to products, and/or servers that store EPC data provide by a reader and/or loaded by a user. RFID tags typically are constructed via a chip (e.g., silicon, germanium, etc.) and an antenna, and EPC data can be encoded (e.g., as a ninety-six or other bit code) therein by a reader and/or other mechanism. EPC data received by the processing module 240 can be processed or unprocessed data. For example, a reader can obtain EPCs from essentially any RFID tag within its antenna's range. Such data typically is raw data that is conveyed to the processing module 240 as a stream, one or more bursts, or one or more data packets. Such conveyance can be through periodic transmissions by the reader. In another example, raw EPC data can be processed by a reader and/or a server, stored within the server, and conveyed to the processing module 240. Raw EPC data typically is filtered and/or processed by the processing module 240, wherein filtering can provide a mechanism to accept desired EPC data and processing can be utilized to format the data in a form suitable to the agents 220. Processed data typically is already in a format suitable for the agents 220 and, thus, generally is not filtered by the processing module 240. However, the invention is not so limited; the processing module 240 can be utilized to further filter and modify the format of the data, if desired.

Figure 3:
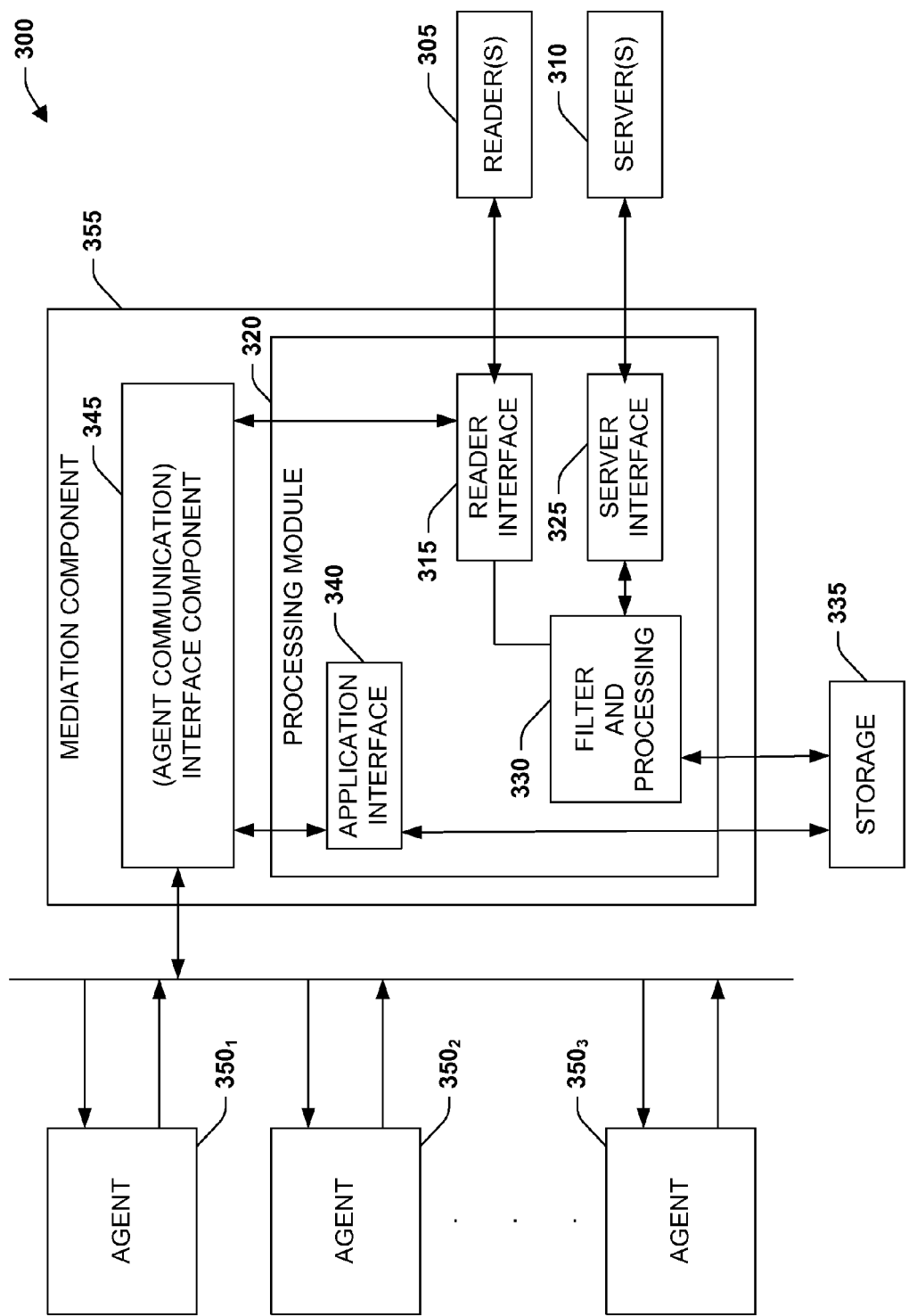
FIG. 3 illustrates an exemplary system that conveys electronic data to agents in an agent-based control system.

FIG. 3 illustrates a system 300 that integrates a mediation component in connection with an agent-based control system. The system 300 includes a plurality of readers 305 that receive EPC and/or other electronic data from RFID tags. The readers 305 can convey the EPC data to one or more servers 310, which can filter, process and/or store the data and/or a reader interface 315 of a processing module 320. The EPC data received by the reader interface 315 through an RFID Reader Driver Plug-in. This interface can utilize various communication channels such as Ethernet, serial port, Firewire, USB, parallel port, etc. in connection with suitable communication protocols (e.g., generic and reader dependent protocols). It is to be appreciated that different plug-ins can be employed by the reader interface 315, based on the manufacturer (or vendor) of the reader. EPCs from the one or more servers 310 can be received by a server interface 325 of a processing module 320. The server interface 325 can include an interface that utilizes an Ethernet or other type of connection.

The processing module 320 further includes a filter and processing component 330 that can be utilized to process raw EPC data received through the reader interface 315 and/or the sever interface 325. The filter and processing component 330 can be utilized to discriminate between EPCs, for example, to recognize and store particular EPCs, while discarding other EPCs. Typically, data received through the server interface 325 is already processed and does not require filtering and/or processing; however, such data may be unprocessed or additional filtering and/or processing may be desired. The filter and processing component 330 can convey the data to a storage component 335. As described previously, suitable storage components can include local and/or remote volatile and/or non-volatile memory.

An application interface 340 of the processing component 320 can be utilized to transfer EPC data stored in the storage component 335 to an agent communication interface 345 coupled to a plurality of agents $350_1$, $350_2$, and $350_3$, collectively referred to as agents 350 and/or essentially any application, for example, applications employing a component substantially similar to the processing module 320. The agent communication interface 345 can provide EPC data to the agents 350 via inter-agent communication mechanisms such as a Subscribe Interaction Protocol. For example, as depicted the agent $350_1$ can subscribe to receive EPC information whenever an RFID tag enters and/or leaves an associated antenna's coverage area. In another example, the agent $350_2$ can query, or request, EPC data. In one instance, such request can be for historical data. For example, the historical data can be related to EPC codes and/or a signal quality indicator read within a specific period of time and/or timestamps and/or signal quality indicators corresponding to a particular EPC code. This information can be conveyed to the agent $350_2$ as a list of records as described next.

It is to be appreciated that the processing module 320, and components therein, and the agent interface component 345 can reside within a meditation component 355, and that the mediation component 355 can be part of or separate from the agent control system. In addition, the mediation component 355 can run within a computer, an industrial controller, and the like.

Figure 4:
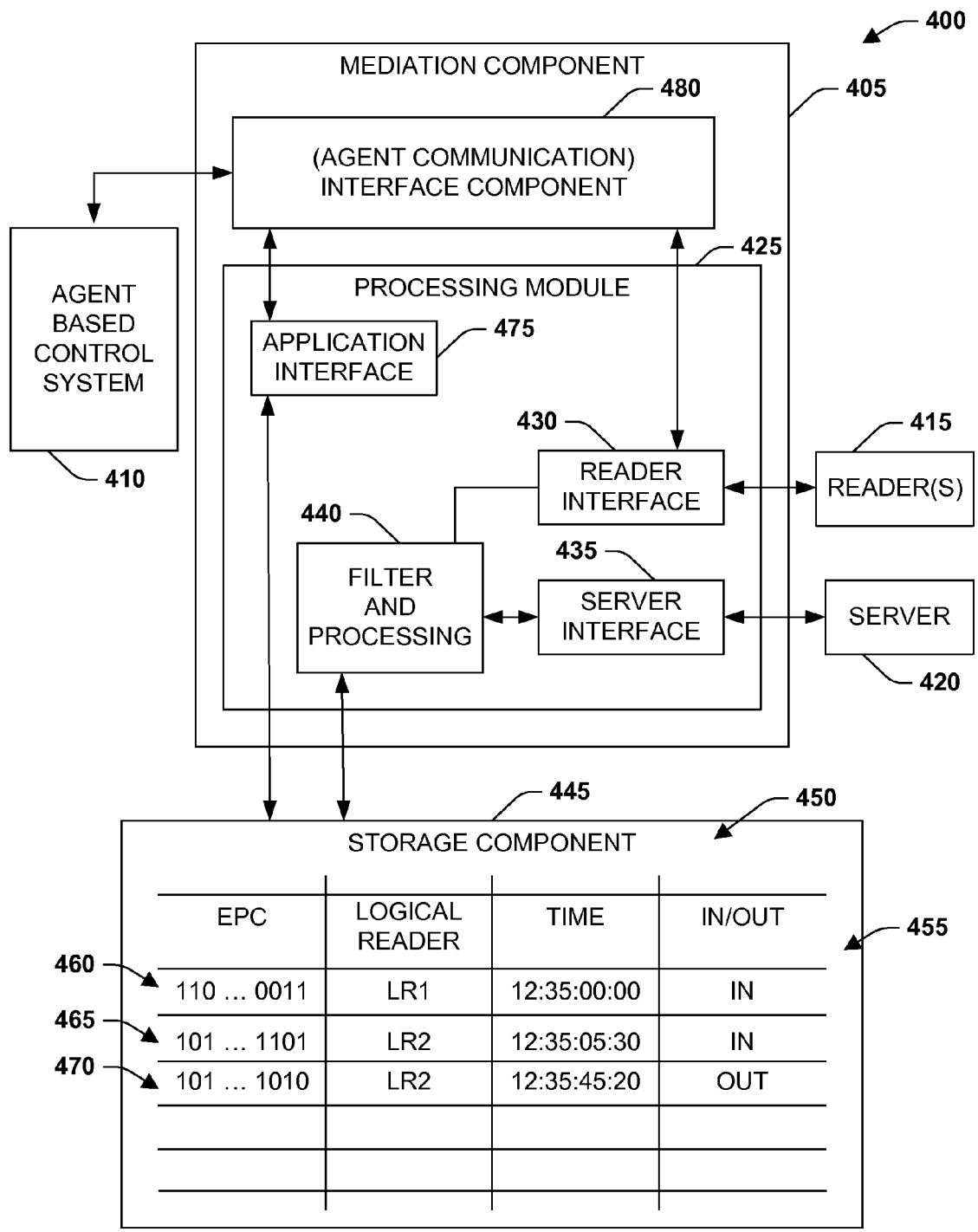
FIG. 4 illustrates an exemplary technique for collecting, storing and distributing electronic data in an agent-based control system.

FIG. 4 illustrates a system 400 that integrates an EPC mediation component 405 with an agent-based control system 410. The system 400 includes a plurality of RFID readers 415 and a server 420 that provides EPC as well as other electronic data to a processing module 425. In general, EPC data from the plurality of readers 415 is received by a reader interface 430 of the processing module 425, and EPC data from the server 420 is received by a server interface 430 of the processing module 425. The reader interface 430 can employ one or more plug-ins (e.g., RFID Reader Driver Plug-ins) to facilitate communication with various readers. For example, each of the readers 415 can employ one or more plug-ins and/or protocols, wherein respective plug-ins can be associated with different reader manufacturers or vendors, reader models, reader software, etc. Such EPC data can be processed and/or raw data and communicated through various communication channels and protocols as described herein. Received EPC data is conveyed by the reader interface 430 and/or the server interface 435 to a filter and processing component 440, wherein the EPC data can be filtered and/or processed, if desired, for example, to selectively accept EPC data and format raw data.

EPC data is conveyed by the filter and processing component 440 to a storage component 445. The storage component 445 is depicted as a two dimensional table; however, it is to be appreciated that this example is illustrative and not limitative, and that essentially any technique for storing data can be employed in accordance with aspects of the invention. For example, the table can be a database of records. In addition, essentially any number of rows and columns can be utilized to store the data, and the table can be one, two, three, four, . . . , N dimensional, wherein N is an integer equal to or greater than one. As depicted, the storage component 445 includes a plurality of columns 450 and a plurality of rows 455 in which EPC data is stored. In this example, the columns 450 are utilized to store EPC codes, logical reader identifiers (e.g., denoting the logical reader), time stamps, and flags that indicate whether a RFID tag is within a coverage area of one or more antennas associated with a reader, respectively. The flag can be set based on incoming EPC (e.g., a sequence of EPC) data and/or by a transmitting reader (e.g., one of the readers 415), the server 420 and/or a photo-eye. It is to be understood that the columns 450 could be utilized to store more or less, and/or different information.

Respective rows 455 are associated with individual EPC codes. By way of example, a first row 460 includes an EPC code 110 . . . 0011, an associated logical reader identifier LR1, a timestamp of 12:35:00:00, and an "IN" flag that denotes the RFID tag entered the coverage area of antennas of the readers 415; a second row 465 includes an EPC code 101 . . . 1101, an associated logical reader identifier LR2, a timestamp of 12:35:05:30, and an "IN" flag that denotes the RFID tag entered the coverage area of the readers 415; and a third row 470 includes an EPC code 110 . . . 1010, an associated logical reader identifier LR2, a timestamp of 12:35:45:20, and an "OUT" flag that denotes the RFID tag left the coverage area of the readers 415. As described in detail below, a logical reader can be defined by one or more physical readers and associated antennas.

The EPC data stored in the storage component 445 can be conveyed through an application interface 475 to an agent communication interface 480, which facilitates distributing the EPC data to one or more agents of the agent based control system 410 and/or other systems. The agent communication interface 480 can provide EPC data to agents within the agent based control system 475 via inter-agent communication mechanisms such as subscribe and/or query mechanisms as described herein.

Figure 5A:
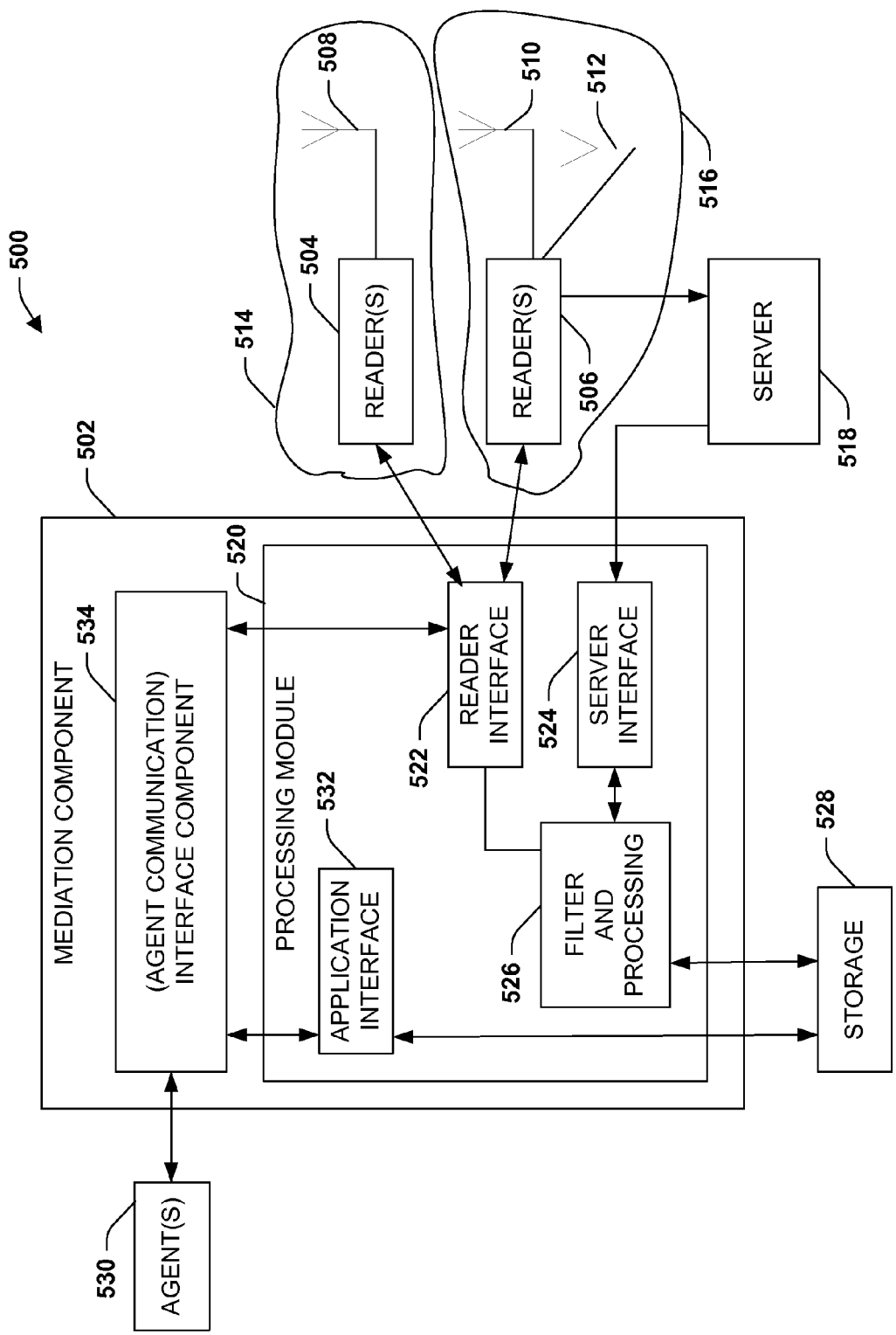
FIG. 5A illustrates exemplary techniques for obtaining electronic data from RFID tags in an agent-based control system.
Figure 5B:
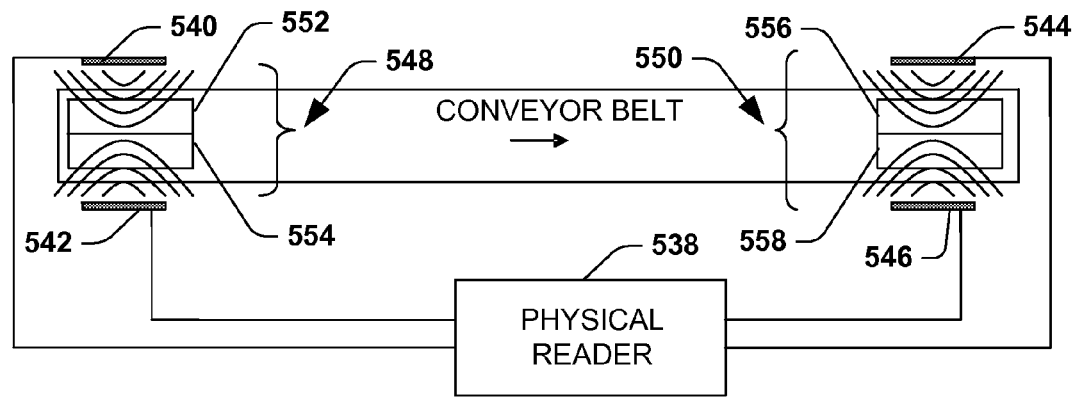
FIG. 5B illustrates an exemplary mapping between one physical reader and two logical readers.
Figure 5C:
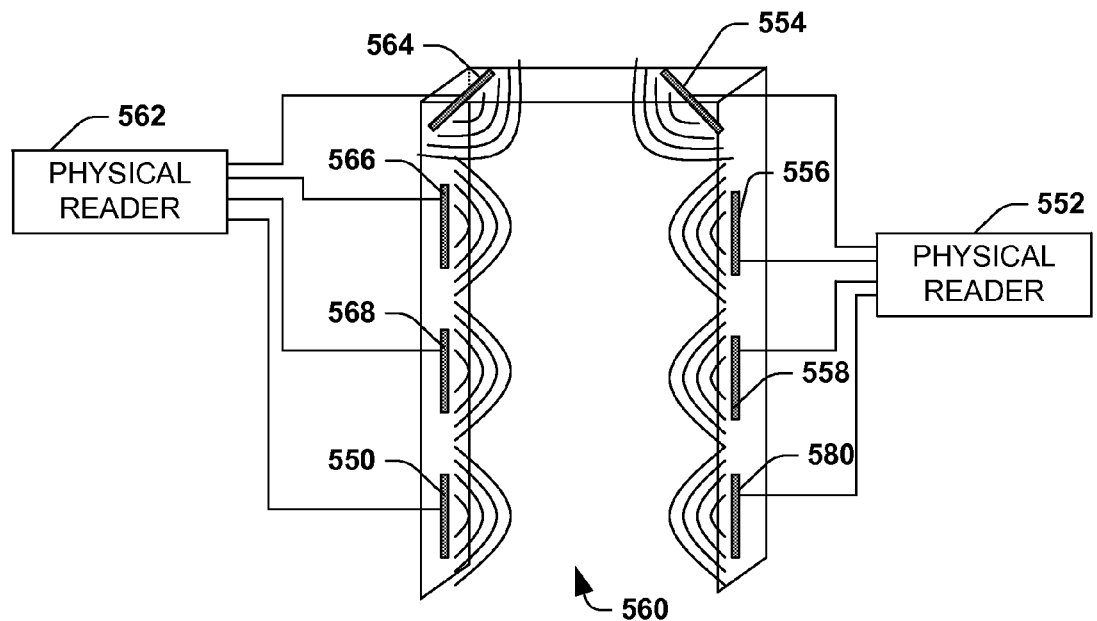
FIG. 5C illustrates an exemplary mapping between two physical readers and one logical reader.

FIG. 5 illustrates a system 500 that includes a mediation component 502 that receives EPC and/or other electronic data via various RFID readers and/or servers. The system 500 includes a physical RFID reader 504 and a physical RFID reader 506. However, it is to be understood that essentially any number of physical readers can be employed in accordance with the invention. The physical RFID reader 504 is associated with an antenna 508, and the physical reader 506 is associated with an antenna 510 and an antenna 512. A logical RFID reader 514 can be formed from the physical RFID reader 504 and the antenna 508, and a logical RFID reader 516 can be formed from the physical RFID reader 506 and the antennas 510 and 512. A reading from antenna 508 can be represented as a reading from the logical RFID reader 514, and a reading from antenna 510 and/or 512 can be represented as a reading from the logical RFID reader 516.

The system 500 further includes a server 518 that stores EPC data. The EPC data stored within the server 518 can be uploaded and/or downloaded from a user and/or programmer's interface (not shown) and/or from the readers 504 and 506. Typically, EPC data received from the readers 504 and 506 is raw data, which can be filtered and processed within the server 518 before, during and/or after saving the EPC data. The EPC data within the server 518 can be stored as records within a database or other formats, for example, binary and ASCII. The EPC data read by the readers 504 and 506 and/or stored in the server 518 can be conveyed to a processing module 520 of the mediation component 502 for storage and distribution to one or more agents of an agent based control system. The processing module 520 can include a reader interface 522 that can accept EPC data from the readers 504 and 506 as described herein. The processing module 520 further includes a server interface 524 that accepts EPC data from the server 518 as described herein. The server interface 560 can include interfaces to a Savant-like server.

The processing module 520 further includes a filter and processing component 526 that can filter EPC data to discriminate between EPCs and format the data. Suitable filtering includes recognizing and filtering duplicate readings. For example, when an RFID tag enters a range of one of the antennas 508, 510 and 512, the corresponding physical RFID reader (physical RFID reader 504 or physical RFID reader 506) periodically reads electronic data transmitted from the RFID tag and sends it to the mediation component 502. In many instances, the reader reads duplicate electronic data emitted by the RFID tag. For example, the reader 504 can read the same EPC code multiple times per second. In another example, two RFID tags can be within the range of the antenna 508. In this instance, the reader 504 can read duplicate data from both RFID tags (e.g., EPC1, EPC2, EPC1, EPC1, EPC2 . . . ). Suitable filtering can recognize and discriminate between the two RFID tags. For example, the filtering can recognize that two tags with different electronic data entered the reader at a particular time and consider the mapping between physical and logical readers. The filter and processing component 526 can convey the EPC data to a storage component 528, and stored EPC data stored can be distributed to one or more agents 530 through an application interface 532 and an agent interface 534, as described previously.

The following discussion provides two specific examples that further explain possible mappings between physical and logical RFID readers. It is to be appreciated that these examples are illustrative and do not limit the invention. A first example depicts a conveyor belt system with a physical reader 538 coupled to a plurality of antennas 540, 542, 544 and 546. The system further includes a logical reader 548 formed from the antennas 540 and 542, and a logical reader 550 formed from the antennas 544 and 546. The antenna 540, for example, can read a tag 552, a tag 554, or both tags 552 and 554 and, simultaneously, the antenna 542 can read the tag 554, the tag 552, or both tags 552 and 554. A filtration module (e.g., the filter and processing component 524) can determine the tags 552 and 554 have been read by the logical reader 548. Likewise, the antenna 544, for example, can read a tag 556, a tag 558, or both tags 556 and 558 and, simultaneously, the antenna 546 can read the tag 558, the tag 556, or both tags 556 and 558. The filtration module can determine the tags 556 and 558 have been read by the logical reader 550. A second example depicts a dock door, wherein a single logical reader 560 is formed from a physical reader 562 and associated antennas 564, 566, 568 and 570 and a physical reader 572 and associated antennas 574, 576, 578 and 580. Utilizing several antennas can ensue that all tags going through the dock door (e.g., on pallets on a track) will be read. Some tags will be read by the antennas 564, 566, 568 and 570 (e.g., tags closer to these antennas), and some tags will be read by the antennas 574, 576, 578 and 580 (e.g., tags closer to these antennas). However, all tags go through the same area and, thus, belong to the same logical reader 560.

Figure 6:
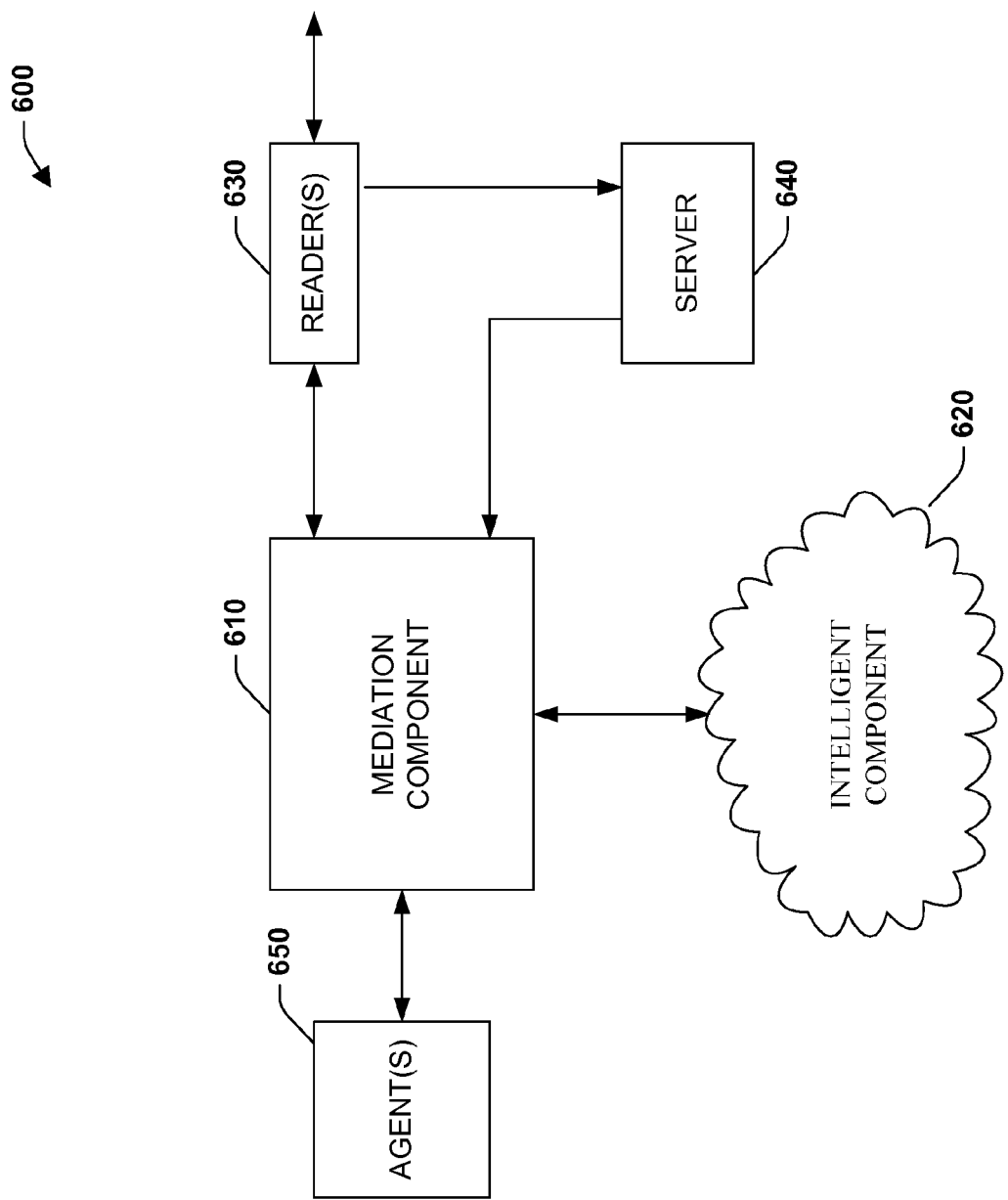
FIG. 6 illustrates an exemplary system that employs intelligence to facilitate electronic product data collection, filtering, processing, storing and/or distribution in an agent-base control system.

FIG. 6 illustrates a system 600 that employs intelligence to facilitate distribution on electronic product data to agents within an agent based control system. The system 600 includes a mediation component 610 that collects, filters, processes and/or distributes the electronic product data. The system 600 further includes an intelligent component 620 that facilitates collecting, filtering, processing and/or distributing the electronic product data utilizing the mediation component 610. For example, a plurality of RFID readers 630 can be associated with respective antenna coverage areas, wherein individual readers can scan and read the electronic product data from RFID tags within their respective coverage areas. Such electronic product data can be conveyed to the mediation component 610. The intelligent component 620 can facilitate recognizing data (e.g., as raw or processed data, the logical reader, the physical reader . . . ) and directing it to the appropriate reader interface (not shown). Similarly, the intelligent component 620 can facilitate recognizing the electronic product data received from a server 640 and directing it to an appropriate server interface (not shown).

Upon receiving electronic product data at an interface, the intelligent component 620 can facilitate determining whether the data should be filtered and/or formatted. Such filtering can include saving electronic product data deemed to be desired and discarding remaining, including duplicate electronic product data. The intelligent component 620 can then be utilized to facilitate storing the electronic product data. For example, the intelligent component 620 can parse the electronic product data and store respective portions within different fields. In one instance, such fields can be associated with a database table as described herein. The intelligent component 620 can facilitate conveying the stored electronic product data to one or more agents 650 as described herein. Such conveyance can be in accordance with agent subscriptions and/or queries, wherein the electronic product data is provided to an agent based on a corresponding subscription or query.

It is to be appreciated that the intelligent component 620 can utilize statistics, heuristics, probabilities, historical data, costs, etc. in connection with facilitating the mediation component 610 by performing a probabilistic and/or statistic-based analysis, which can be utilized to infer and/or render decisions. As utilized herein, the term "inference" and variations thereof generally refers to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

FIGS. 7-10 illustrate methodologies, in accordance with an aspect of the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

Figure 7:
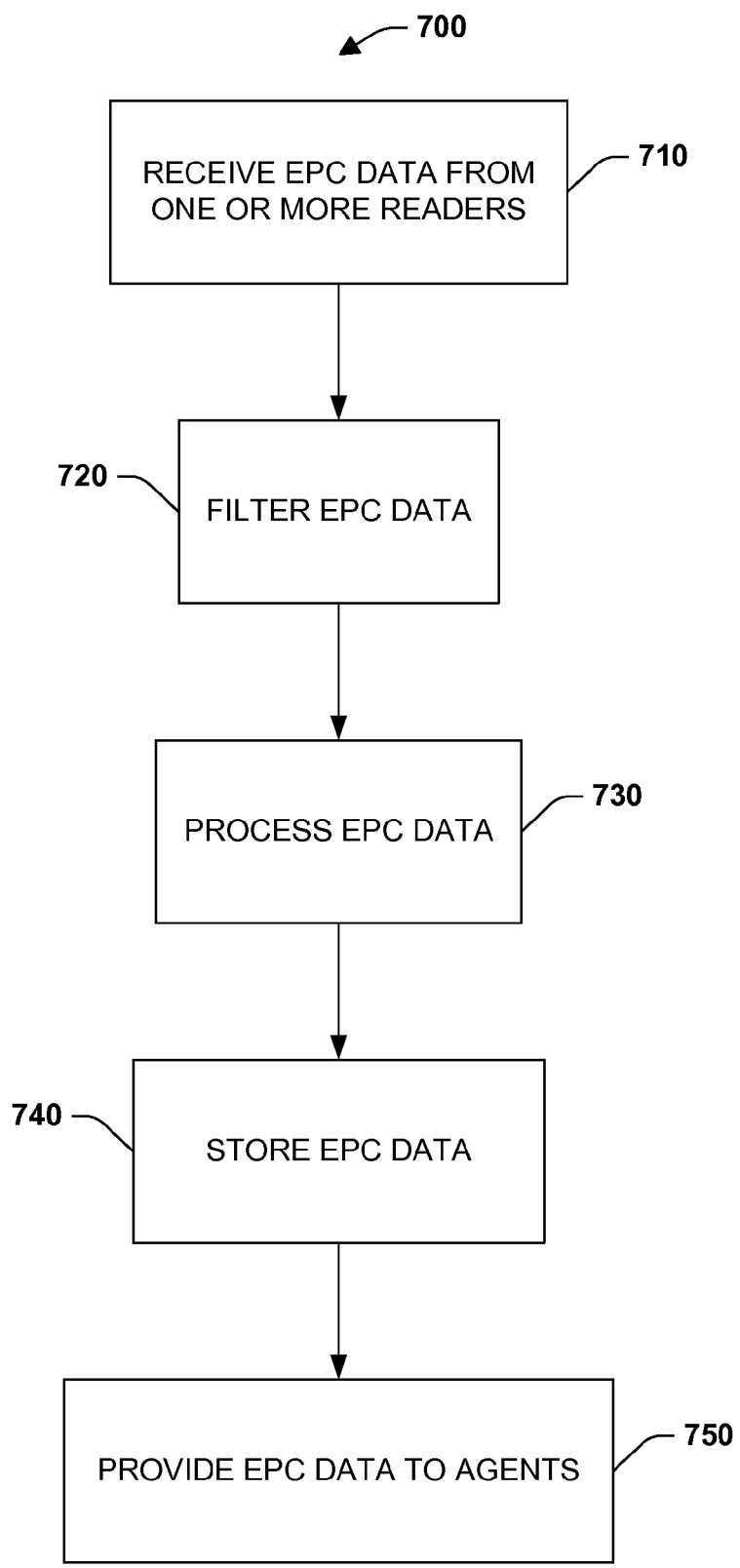
FIG. 7 illustrates an exemplary methodology for storing and distributing electronic product data received from an RFID reader.

FIG. 7 illustrates a method 700 for distributing electronic product data (e.g., EPC codes, logical reader identifiers, timestamps, flags, product type, date of manufacture, lot number, case information, pallet information, and container information) received from RFID readers to agents in an agent-based control system. At 710, electronic product data (e.g., unprocessed and processed) from one or more RFID readers is received. The electronic product data from the reader can be received by one or more reader interfaces such as an RFID reader plug-in associated with the manufacturer of the reader. Typically, conveyance of the electronic product data is through an Ethernet connection utilizing a communication protocol supported by the reader manufacturer.

At 720, the electronic product data is filtered. Such filtering includes recognizing and filtering duplicate readings. For example, when an RFID tag enters a range of an antenna of a reader, the reader begins to periodically read the electronic data from the RFID tag and send the read data. In many instances, the reader reads duplicate electronic data emitted by the RFID tag (e.g., the same EPC code, for example, 100 readings of the same EPC per second). In another example, two RFID tags can be within the range of the antenna. In this instance, the reader can read duplicate data from both RFID tags (e.g., EPC1, EPC2, EPC1, EPC1, EPC2 . . . ). The filtering can recognize that two tags with different electronic data entered the reader at a particular time and consider the mapping between physical and logical readers. At reference numeral 730, electronic product data is processed. Such processing includes formatting the electronic product data for subsequent storage, recognizing electronic product data of interest, etc. At 740, the electronic product data is stored. In one instance, the electronic product data is stored as records in a table, wherein individual rows are utilized to delineate related electronic product data across fields, or columns. In one example, individual fields can store the electronic product code, a logical reader, a timestamp, a flag that indicates whether a RFID tag is within an antennas range, etc.

At reference numeral 750, stored electronic product data is provided to one or more agents of the agent-based control system. Conveyance of such data can be in response to a subscription (e.g., a Subscribe Interaction Protocol) by the agent to receive electronic product code information and/or signal quality information whenever an RFID tag enters an antennas range. In another instance, one or more of the agents can automatically receive such information. In yet another example, intelligence can be employed to determine when or if received and/or stored electronic product data should be conveyed to an agent. In still another example, conveyance can be in response to a request for historical information. It is to be appreciated that communication between agents of the agent-based control system and the RFID readers is bi-directional, and any of the agents can transmit to an RFID reader. For example, an agent can transmit a command(s) to instruct an RFID reader to transition to an ON state, transition to an OFF state, write to a tag, write data, etc.

Figure 8:
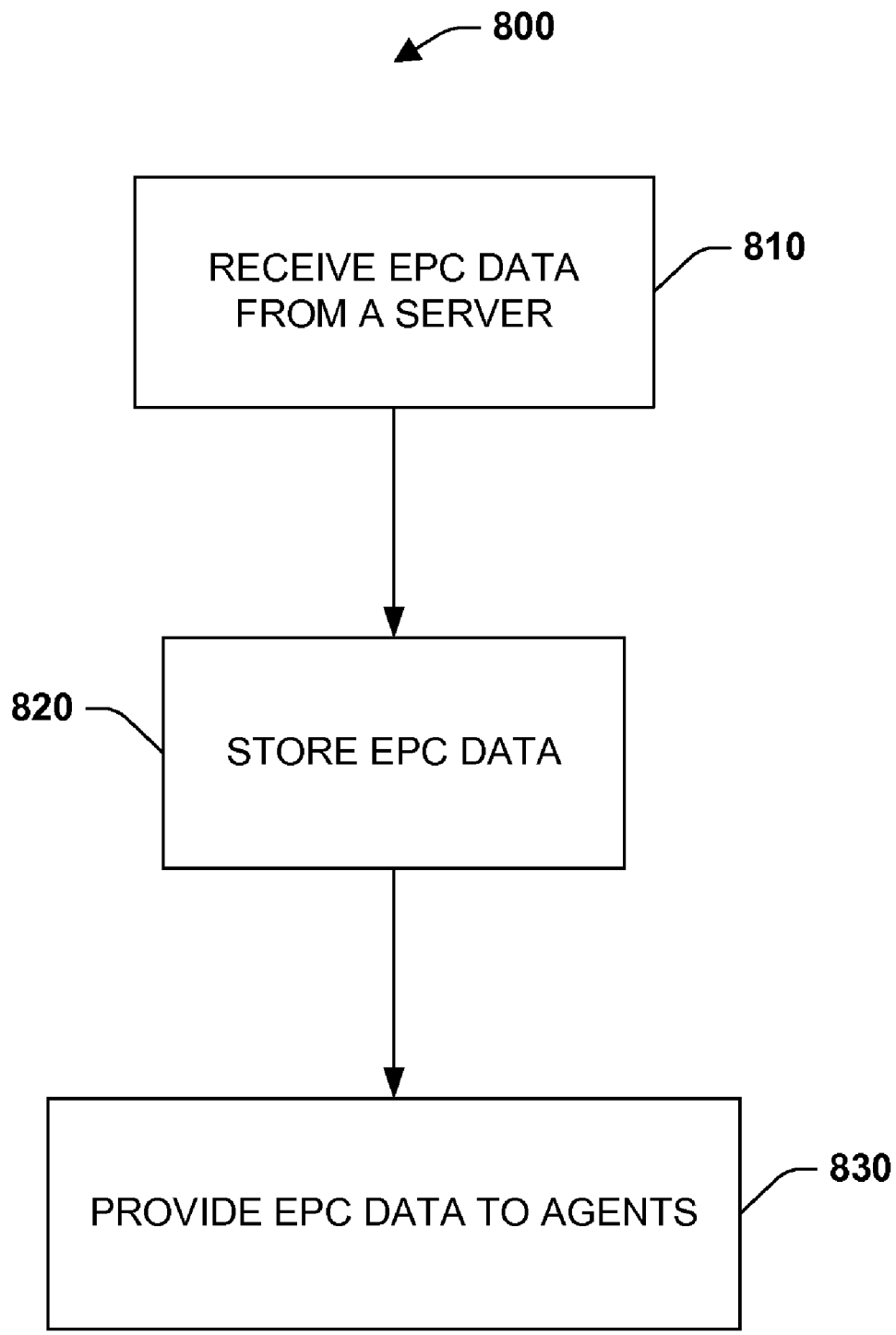
FIG. 8 illustrates an exemplary methodology for storing and distributing electronic product data received from a server.

FIG. 8 illustrates a method 800 for distributing electronic data obtained from a server to agents in an agent-based control system. At reference numeral 810, EPC data from a server is received. For example, a server interface can be provided to receive electronic data from essentially any server. Typically, such data is formatted and stored, for example, within records of a database associated with the server. In these instances, the formatted data or records can be conveyed to the server interface. Typically, electronic data can be conveyed through an Ethernet connection utilizing a communication protocol supported by the server. However, it is to be appreciated that any wire and/or wireless connection can be utilized in accordance with aspects of the invention.

At 820, the electronic data can be stored. If desired, prior to storage the electronic data can be filtered and/or processed. However, the electronic data received from a server typically has been filtered and processed and, thus, additional filtering and processing may or may not be desired. In one example, the electronic data is stored as records in a table. As such, individual rows can include one or more fields that store particular portions of the electronic data. For example, individual fields can store the electronic data code, a logical reader identifier, a timestamp, a flag that indicates whether a RFID tag is within an antenna's coverage area, etc. At reference numeral 830, stored electronic data can be provided to one or more agents of the agent-based control system. Conveyance of such data can be in response to a subscription and/or query.

Figure 9:
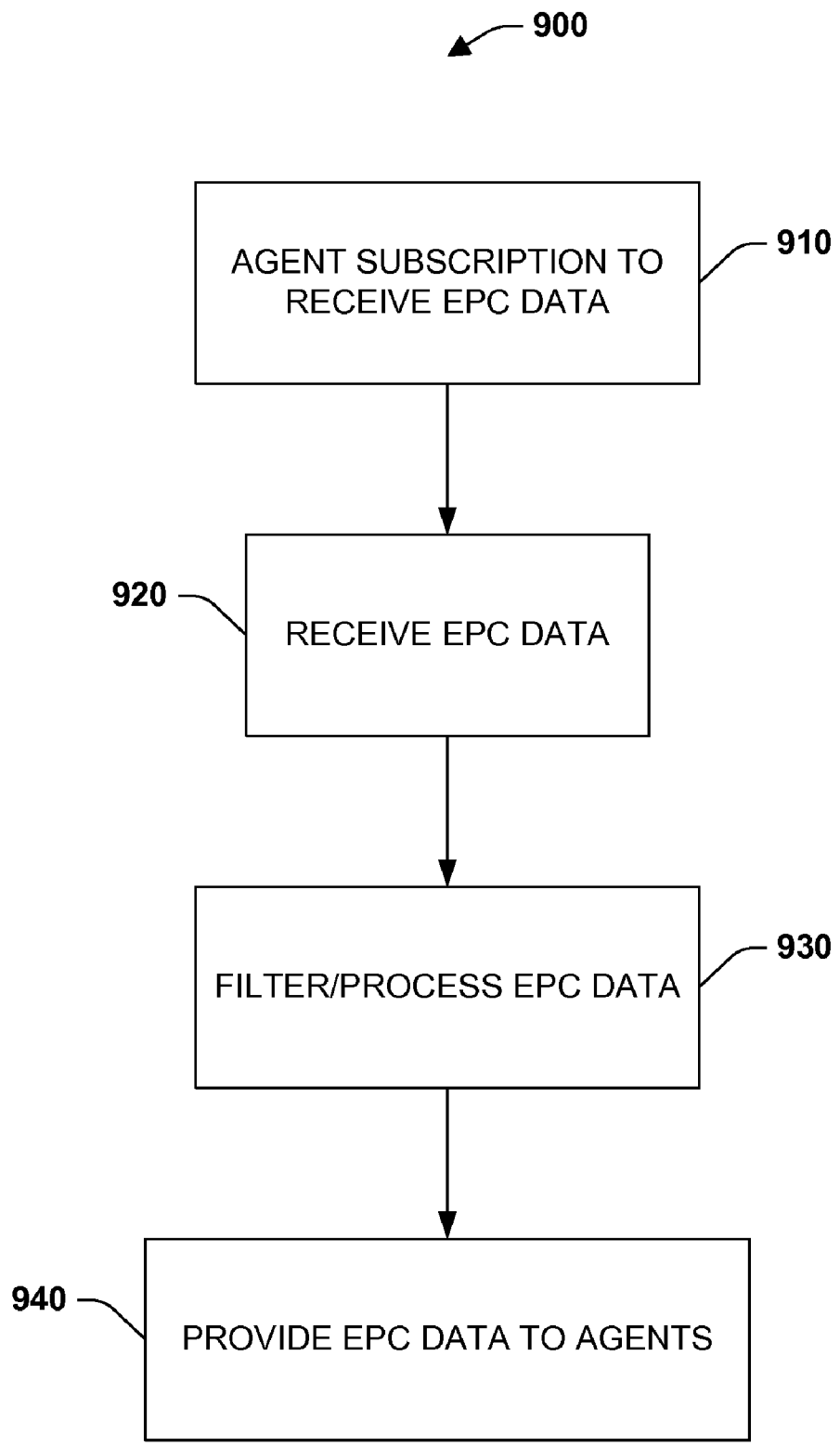
FIG. 9 illustrates an exemplary methodology for subscribing to receive electronic product data.
Figure 10:
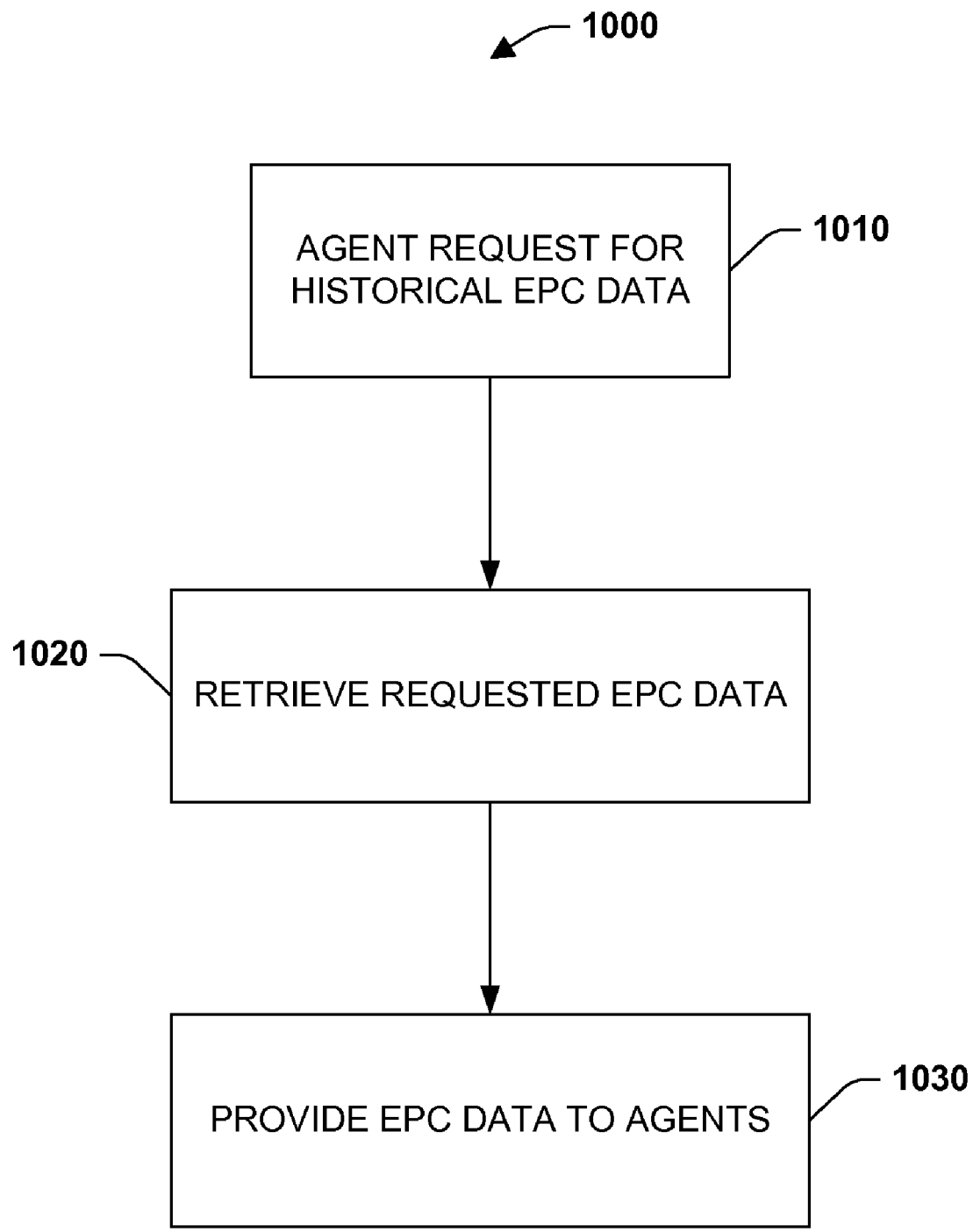
FIG. 10 illustrates an exemplary methodology for responding to requests for historical electronic product data.

FIG. 9 illustrates a method 900 that provides electronic data to agents in an agent-based control system. At reference numeral 910, one or more agents subscribe to receive electronic data code information whenever an RFID tag enters an antenna's coverage area. At 920, electronic data received from a reader and/or a server. At 930, the electronic data is filtered, processed and/or stored as described herein. At 940, the electronic data is provided to subscribed agents. FIG. 10 illustrates a method 1000 for an agent to retrieve electronic data. At reference numeral 1010, one or more agents issue a query for electronic data. Such query can be a request for historical data from an EPC database. For example, the query can be to get all electronic data codes read within a particular time period (e.g., between two timestamps). In another example, the query can be for a list of timestamps corresponding to a particular electronic data code. At 1020, the mediation component retrieves the requested data, and at 1030, the requested data is provided to requesting agent.

Figure 11:
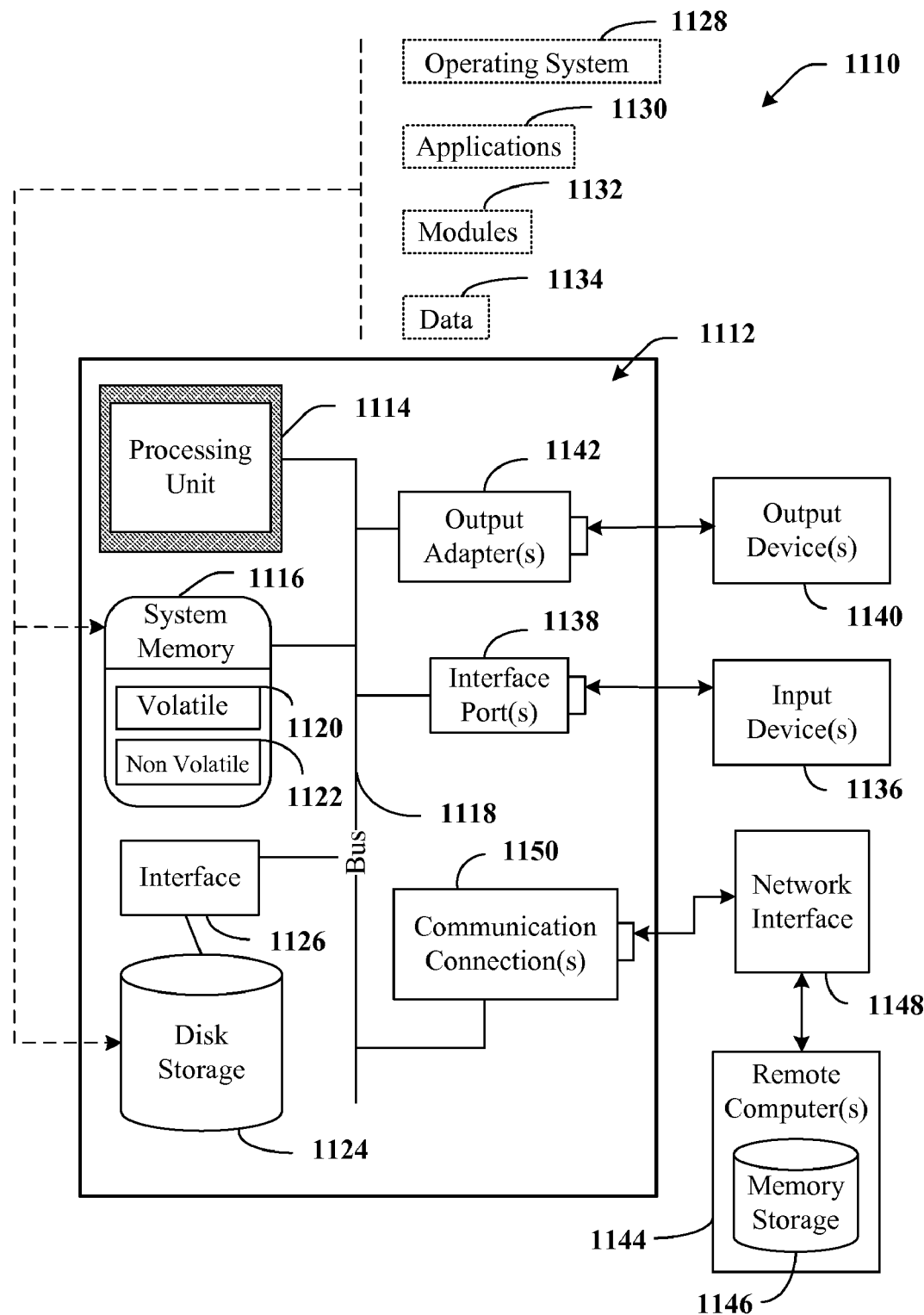
FIG. 11 illustrates an exemplary computing architecture that can be employed in connection with the subject invention.
Figure 12:
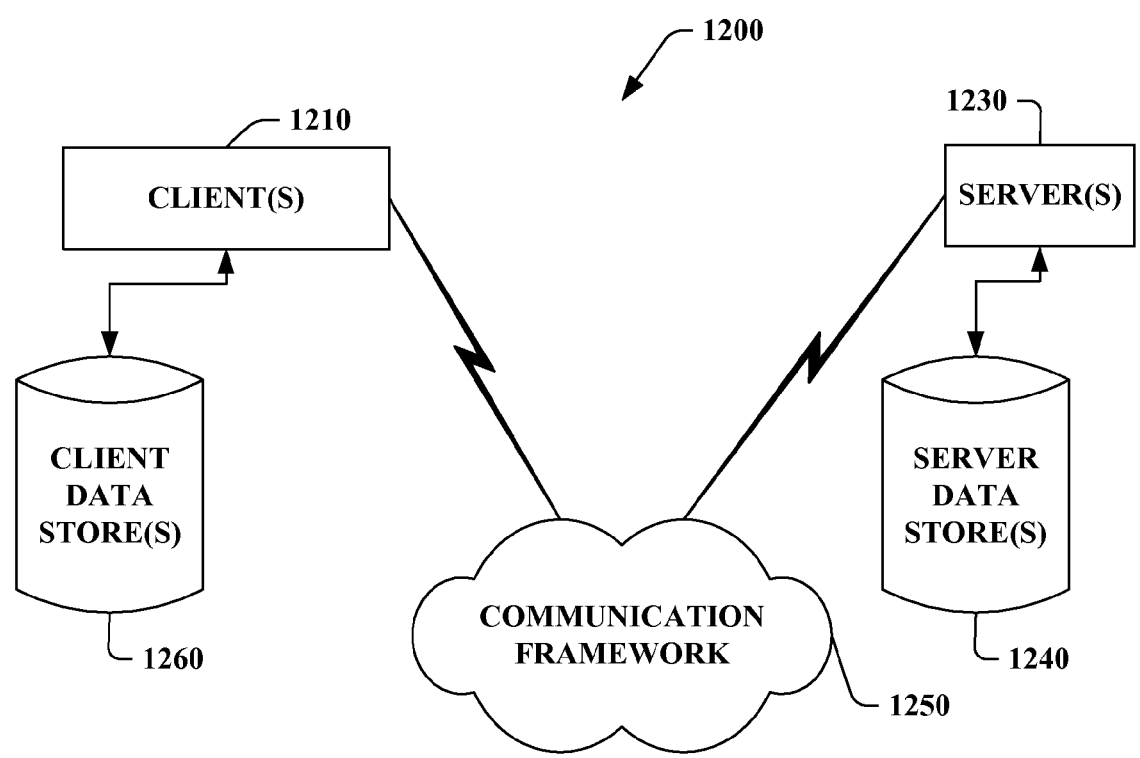
FIG. 12 illustrates an exemplary networking environment that can be employed in connection with the subject invention.

In order to provide a context for the various aspects of the invention, FIGS. 11 and 12 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 11126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the present invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates distribution of electronic product data, comprising:
    a first component that stores structured electronic product data received from one or more RFID readers that obtain the electronic product data from RFID tags;
    a second component that receives a query from an agent of an agent-based control system for at least a portion of the stored electronic product data, the agent is responsible for local decision making with respect to a portion of a manufacturing process and cooperates with at least one disparate agent to provide desirable global behavior of the agent-based control system; and
    a third component that provides the portion of the electronic product data to the agent.

2. The system of claim 1, further comprising a component that associates the received electronic product data with an RFID reader that obtained the electronic product data.

3. The system of claim 1, further comprising a component that associates the received electronic product data with its RFID tag.

4. The system of claim 3, further comprising a component that associates the received electronic product data with a logical RFID reader.

5. The system of claim 1, the third component provides the portion of the electronic product data to the agent upon receipt by the first component if the agent has subscribed to receive the portion of the electronic product data.

6. The system of claim 1, the second component receives a query from the agent for a signal quality indicator associated with the portion of the electronic data, and the third component provides the requested signal quality indicator to the agent in response to the query.

7. The system of claim 1, the query from the agent includes a specification of a time period, and the portion of the electronic product data includes only data received by the first component during the specified time period.

8. The system of claim 1, the first component stores the electronic product data as a table of records, each record corresponding to an electronic product code and including at least a timestamp and a logical reader identifier.

9. The system of claim 1, the first component processes the received electronic product data to place the data in a format suitable for use by the agent.

10. The system of claim 1, the first component further comprising a filter that prevents storage of duplicate electronic data received from the one or more RFID readers.

11. A method for providing electronic data to agents in an agent-based control system, comprising:
    receiving the historical electronic data from an RFID tag, wherein the historical electronic data comprising electronic product data obtained by an RFID reader;

storing the received historical electronic data;

receiving a query from an agent for historical electronic data; and providing the historical electronic data as records to the agent via an inter-agent communication mechanism, the agent is responsible for local control of a portion of a manufacturing process and cooperates with at least one disparate agent to provide desirable global behavior of the agent-based control system.

12. The method of claim 11, further comprising associating the received historical electronic data with the RFID tag from which the data was received.

13. The method of claim 11, further comprising:

receiving a query from the agent for a signal quality indicator associated with the historical electronic data; and providing the signal quality indicator to the agent in response to the request.

14. The method of claim 11, further comprising:

receiving a specification of a time period as part of the query; and providing only a subset of the historical electronic data that was received within the specified time period.

15. The method of claim 11, further comprising converting the received historical electronic data to a format suitable for use by the agent.

* * * * *